United States Patent [19]
Rosen

[11] Patent Number: 6,081,790
[45] Date of Patent: Jun. 27, 2000

[54] SYSTEM AND METHOD FOR SECURE PRESENTMENT AND PAYMENT OVER OPEN NETWORKS

[75] Inventor: Sholom S. Rosen, New York, N.Y.

[73] Assignee: Citibank, N.A., New York, N.Y.

[21] Appl. No.: 09/045,244

[22] Filed: Mar. 20, 1998

[51] Int. Cl.⁷ .................................................. G06F 17/00
[52] U.S. Cl. ................. 705/40; 705/30; 705/34; 705/39; 380/21
[58] Field of Search ................... 705/44, 30, 34, 705/35, 39, 40; 380/21

[56] References Cited

U.S. PATENT DOCUMENTS

| | | |
|---|---|---|
| 5,220,501 | 6/1993 | Lawlor et al. . |
| 5,383,113 | 1/1995 | Kight et al. . |
| 5,453,601 | 9/1995 | Rosen . |
| 5,465,206 | 11/1995 | Hilt et al. . |
| 5,557,518 | 9/1996 | Rosen . |
| 5,671,280 | 9/1997 | Rosen . |
| 5,699,528 | 12/1997 | Hogan . |
| 5,739,511 | 4/1998 | Pedersen ................................ 235/380 |
| 5,850,442 | 12/1998 | Muftic ...................................... 380/21 |
| 5,870,473 | 2/1999 | Boesch et al. ............................ 380/21 |
| 5,903,882 | 5/1999 | Asay et al. ................................ 705/44 |
| 5,930,778 | 9/1999 | Geer ......................................... 705/45 |

OTHER PUBLICATIONS

"Internet Billing Service Design and Prototype Implementation", Marvin A. Sirbu, IMA Intellectual Property Project Proceedings, vol. 1, Issue 1, Jan. 1994.

Schneier, Bruce, "Applied Cryptography, Protocols, Algorithms, and Source Code in C", 1994, John Wiley & Sons, Inc. NY, pp. 1–16 and 70–71.

*Primary Examiner*—Thomas R. Peeso
*Attorney, Agent, or Firm*—Morgan & Finnegan, LLP

[57] ABSTRACT

A system for secure presentment and payment having a first electronic processing device and a second electronic processing device. The first processing device creates a presentment ticket from stored invoice data, and securely transmits the presentment ticket and the invoice data to the second processing device. The second processing device determines which invoices are to be paid and creates a corresponding remittance advice which it securely transmits to said first processing device. The first processing device creates a commercial payment ticket corresponding to the remittance advice and securely transmits it to the second processing device. The second processing device then securely transmits electronic money to the first processing device in an amount corresponding to that specified in the remittance advice.

29 Claims, 46 Drawing Sheets

NETWORK CONFIGURATION

INVOICE / PAST DUE NOTICES

| INVOICE ID | CUSTOMER INFORMATION | MERCHANT INFORMATION | PURCHASE ORDER | TRANSACTION DATES | TYPE | PAYMENT TERMS | ITEMS SHIPPED | ITEMS BACKORDERED | INVOICE AMOUNT |
|---|---|---|---|---|---|---|---|---|---|
| 60 | 62 | 64 | 66 | 68 | 70 | 72 | 74 | 76 | 78 |

FIG. 2A

REMITTANCE ADVICE

| CUSTOMER INFORMATION | MERCHANT INFORMATION | DATE OF PAYMENT | PAYMENT AMOUNT |
|---|---|---|---|
| 46 | 47 | 48 | 49 |
| LIST OF INVOICES 50 | | | |

FIG. 2B

TRUSTED AGENT COMPONENTS

COMMIT

ABORT

Establish Session (continued)

Abort Transaction

Message Encryption Layer

Establish Session (MM) (continued)

Establish Session (MM) (continued)

SYSTEM AND METHOD FOR SECURE PRESENTMENT AND PAYMENT OVER OPEN NETWORKS

FIELD OF THE INVENTION

The present invention relates to a system for party-to-party invoice and past due notice presentment with payment on demand over open networks. The system utilizes tamper-proof electronic units, referred to as "trusted agents" in combination with money modules to create a secure merchant presentment and customer payment transaction.

BACKGROUND OF THE INVENTION

Numerous electronic payment systems are currently being developed to accommodate the growth in electronic commerce. One method of electronic payment is described in my U.S. Pat. Nos. 5,453,601, 5,557,518, and U.S. Ser. No. 08/427,287 filed Apr. 21, 1995, pending, the disclosures of which are incorporated herein by reference. These patents and the pending application disclose an electronic monetary system for implementing electronic money payments as an alternative medium of exchange to cash, checks, credit cards, debit cards, and electronic funds transfers. In particular, the described system uses money modules packaged in tamper-proof housings to store and transfer electronic notes. Money module payments may be either real-time, off-line payments between money modules (e.g., between a money module contained within a customer's "electronic wallet" and a money module contained within a merchant's point-of-sale terminal), or on-line payments for network services such as information retrieval and telephone calls, or for purchasing airline tickets, theater tickets, etc.

The trusted agents discussed herein are fully described in U.S. Pat. No. 5,557,518. That patent describes a system for enabling the secure delivery of electronic merchandise with real-time anonymous payment or authorization-based payment. The system allows both the customer and merchant to feel secure that their interests are being served.

U.S. Pat. No. 5,671,280 describes a system where a customer trusted agent provides remittance information to a merchant trusted agent which then provides a commercial payment ticket to the customer trusted agent. Receipt of the commercial payment ticket initiates a transfer of electronic money from the customer to the merchant. Such a system thus describes a payment made at the customer's convenience after receipt of an invoice. Payment is made electronically with proof of payment which can close out the receivable and payable in real time.

The present invention describes a system that enables a merchant to securely present invoices or past due notices to a customer over an open network like the internet. Furthermore, the present invention enables a customer to pay in real time upon presentment. Conventional back office payment systems may be greatly simplified by the present invention resulting in lower costs and fewer errors. Enabling immediate payment will allow the merchant to reduce the cost of funds and the resources to track outstanding balances. Merchants, in turn, will be able to more readily provide a discount to customers to incent immediate payment. For invoices that are past due, the present invention enables the merchant to close out the past due receivables without the laborious tracking and telephoning required today, thereby reducing the cost of collections.

SUMMARY OF THE INVENTION

It is an object of the invention to provide a secure system using trusted agents that enables presentment of invoices and past due notices from merchant to customer without any intermediaries.

It is a further object of the present invention to provide a payment system that securely integrates the presentment of invoices and past due notices to real time payment of selected ones of those items presented for payment.

It is yet a further object of the present invention to provide a system where both presentment and payment information is electronically signed by trusted agents so that neither merchant nor customer can effectively repudiate.

According to one aspect of the invention, there is a first electronic processing device having at least one data processor, memory and cryptographic means, and a second electronic processing device having at least one data processor, memory, and cryptographic means. The first processing device creates a presentment ticket from stored invoice data. The presentment ticket and the invoice data are securely transmitted to the second processing device. The second processing device determines which invoices are to be paid and creates a corresponding remittance advice which it securely transmits to the first processing device. The first processing device creates a commercial payment ticket corresponding to the remittance advice and securely transmits it to the second processing device. The second processing device then securely transmits electronic money to the first processing device in an amount corresponding to that specified in the remittance advice.

DESCRIPTION OF THE DRAWINGS

The invention will be described in greater detail below with reference to the attached drawings, of which:

FIGS. 2A–2B illustrate the data included in an Invoice/Past Due Notice and a Remittance Advice.

DESCRIPTION OF THE PREFERRED EMBODIMENT

As described in U.S. Pat. No. 5,557,518, a trusted agent is a combination of hardware and software components. It is tamper-proof and contains secure protocols which cooperate with a money module to synchronize secure payment to delivery. Money modules are tamper-proof devices capable of storing and transferring electronic money. The electronic money is preferably in the form of electronic notes that are representations of currency or credit. Money modules are also capable of establishing cryptographically secure communication sessions with other devices. The preferred embodiment of the present invention utilizes the transaction money modules described in my U.S. Pat. No. 5,453,601 and in my co-pending U.S. patent application Ser. No. 08/427,287.

Figure 1:
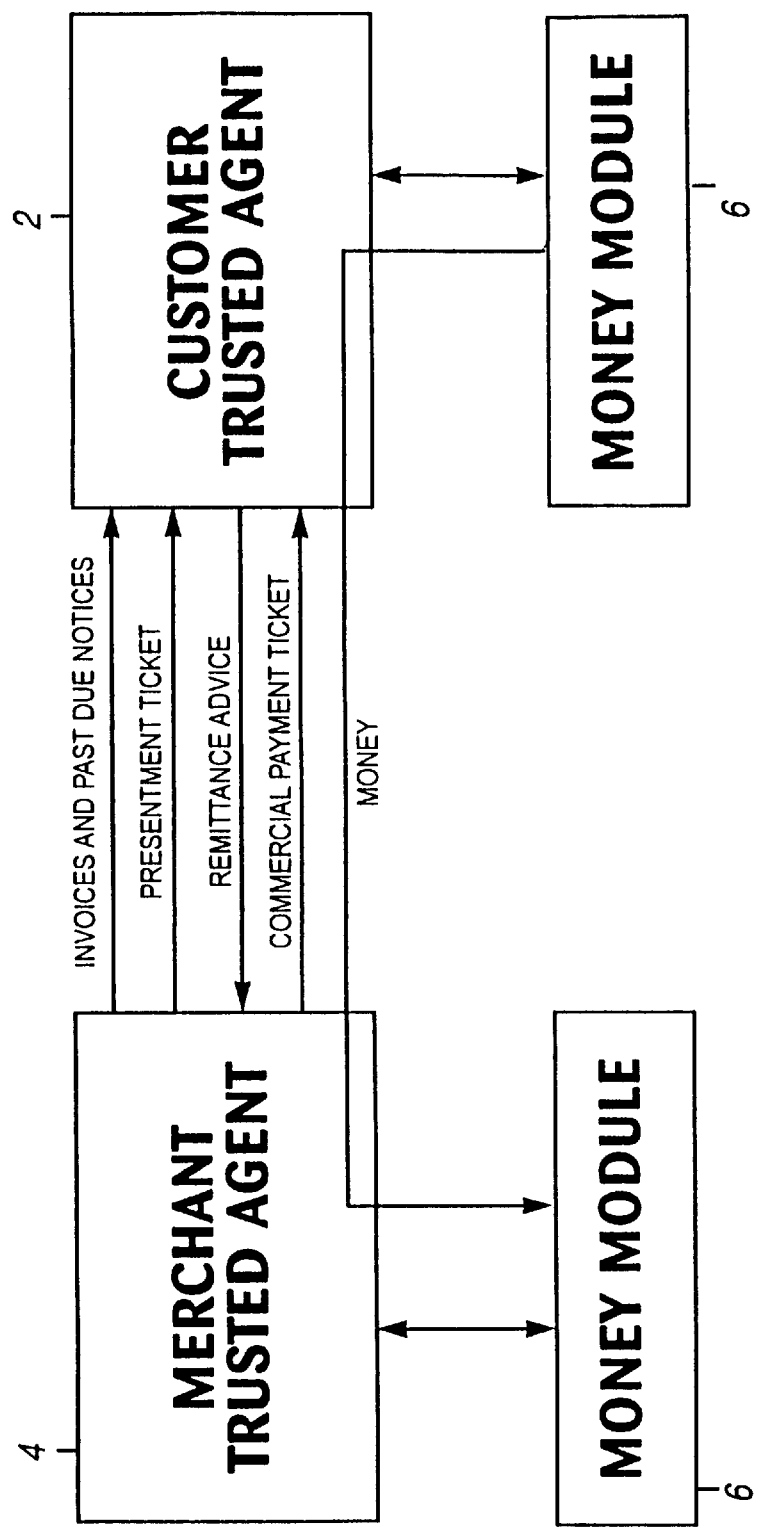
FIG. 1 is a diagram showing the merchant and customer trusted device interaction.

In the present invention for secure presentment and payment, as shown in FIG. 1, the merchant's trusted agent 4 (MTA) sends a presentment ticket and invoice and/or past due notices to the customer's trusted agent 2 (CTA). The CTA 2 then sends remittance information to the MTA 4 and the MTA 4 sends a commercial payment ticket to CTA 2. Finally, a money module payment takes place where the customer's money module 6 sends electronic money to the merchant's money module 6 via CTA 2 and MTA 4.

In the present invention, presentment of invoices and past due notices is party-to-party so that the formats can be flexible, unlike current electronic data interchange (EDI) systems which are run by third parties and require standardized formats. Many commercial arrangements require varied formats. As shown in FIG. 2A, the types of information provided in an invoice or past due notice may include an invoice id 60, customer information 62, merchant information 64, purchase order number 66, transaction dates 68 (e.g., order date and shipping date), type 70 (e.g., invoice, first notice, past due notice), payment terms 72 (e.g., discounts upon early or immediate payment), items shipped 74, items back ordered 76, and the invoice amount 78. By way of further example, a past due notice could include multiple past due invoices along with summary amounts. Obviously, the general form of invoice would vary from the above if it related to services rather than physical goods. In the present invention, such invoicing and other information may be processed by specific host application software shared by the merchant and customer. Host application software can be securely distributed by the merchant to his customers via trusted agents.

As shown in FIG. 2B, a remittance advice contains information needed to consummate the transaction. Such information may include: customer and merchant information 46, 47 (e.g., name and address of the customer and merchant, customer reference number, network address of the merchant), the date of payment 48, the amount to be paid 49, and the list of invoices to be paid 50. Invoice information includes sufficient information for the merchant to match to data in the accounts receivable system and to use in a dispute.

Tickets

Figure 3:
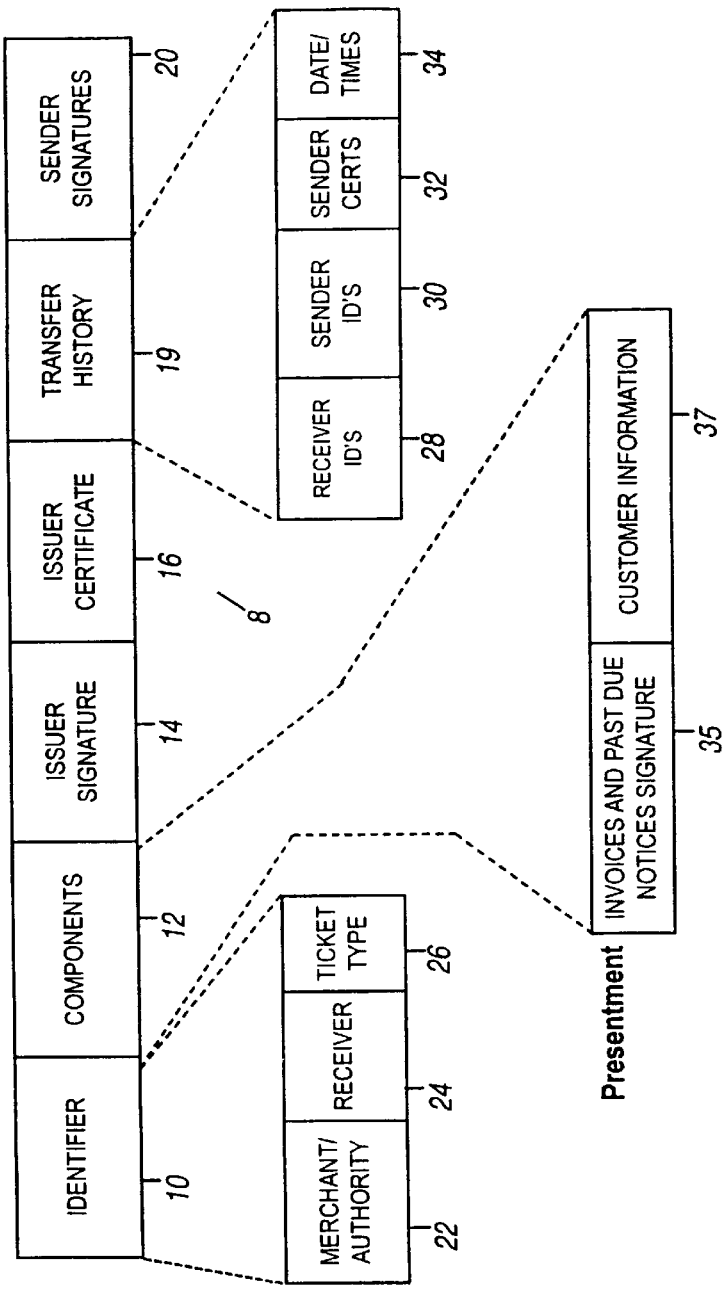
FIG. 3 illustrates the sections and fields of a Presentment Ticket and a Commercial Payment ticket.

Referring to FIG. 3, a ticket 8 is an electronic item created by a MTA 4 and transferred to a CTA 2 during a transaction. Tickets may be thought of as the property of the trusted agents. A customer whose CTA 2 has just received a ticket may only use that ticket upon successful completion of the transaction.

The present invention utilizes two ticket types: a presentment ticket and a commercial payment ticket. A presentment ticket includes the presenters digital signature over the invoices and/or past due notices presented to the customer. A commercial payment ticket identifies the particulars of a commercial payment and has the payee's digital signature over the remittance advice. Both types of ticket can be used in a dispute scenario.

FIG. 3 shows a preferred embodiment of a ticket 8 in which the ticket is comprised of six major sections: Identifier 10, Components 12, Issuer Signature 14, Issuer Certificate 16, Transfer History 18 and Sender Signatures 20. The sections, in turn, are comprised of various information containing fields.

The Identifier section 10 has a field 22 which holds information that identifies the merchant or authority creating the ticket. Such information, for example the merchant's or authority's name, is copied from a merchant or authority credential held by the ticket issuer. The field 22 also contains the expiration date of the merchant or authority credential. A field 24 contains the receiving trusted agent's identification number. The field 24 also contains the expiration date of the ticket receiver's trusted agent credential. A field 26 designates the ticket type (e.g., credit or debit card ticket, commercial payment ticket, etc.).

The Components section 12 contains the basic ticket content which varies depending upon the ticket type and its specific purpose. FIG. 3 shows an example of components found in a presentment ticket and a commercial payment ticket.

A presentment ticket may have an Invoices and Past Due Notices Signature field 35 that is the MTA's digital signature over the invoice and/or past due notice information being presented to the customer. It may also have customer information 37 which can be acquired from the customer's credential (e.g., customer name and address, credential authority, credential expiration date).

Alternatively, the field 35 may contain a group signature of the invoicing data. A group signature may be created by a method of signing a group of electronic objects $M_1$, $M_2$, ... $M_k$ which have identifiers id $M_1$, id $M_2$, ... id $M_k$. With such a group signature, the signer only has to perform one private key operation and the verifier one public key operation. Also, the receiver of the group can divide the group into subsets of objects so that each subset can be verified independently of the other objects.

A group signature may be created as follows:

1. Generate $h(M_1)$, $h(M_2)$, ... $h(M_k)$
2. Let $T = id(M_1) \| h(M_1) \| id(M_2) \| h(M_2) \| ... \| id(M_k) \| h(M_k)$
3. Let $\sigma(M_1, M_2, ... M_k) = D_k(h(T)) \| T$ be the group signature.

If $M_{i_1}, ... M_{i_j}$ is a subset of the objects, verification is done as follows:

1. Calculate $h(T)$;
2. Calculate $E_k(D_k(h(T))) = S$; and
3. Verify $h(T) = S$, otherwise invalid.

Then for each $M_{i_j}$:

1. Find $id(M_{i_j})$ in T, otherwise invalid;
2. Calculate $h(M_{i_j})$; and
3. Check if $h(M_{i_j})$ equals the value following $id(M_{i_j})$ in T, otherwise invalid.

Where $\|$ = Concatenate data strings h = One-way hash function (e.g., Secure Hash Algorithm (SHA) or Message Digest-5 (MD-5)

$E_k$ = Encrypt with public key $D_k$ = Decrypt with private key

The group signature can be used in the presentment ticket to make the signing and verification process more efficient. The id M could be the invoice number. It allows the merchant to demonstrate, on a selected basis, that invoices have been presented. In particular, the merchant can send the customer the presentment ticket and the unpaid invoice for verification.

The group signature could also be used in the Electronic Monetary System described in U.S. Pat. No. 4,453,601 to reduce the signature and verification time for the transfer of more than one note. In such an application, the group signature would apply to each individual note on a selective basis when the notes are separately transferred and verified by a receiving money module.

A group signature may also be computed using methodology other than that described above. For example, an alternative group signature using an authorization tree methodology may be used as described in U.S. Pat. No. 4,309,569 to R. Merkle.

A commercial payment ticket may have: a Customer Information field 36; a Merchant Information field 38; a Date of Payment field 40; an Amount Paid field 42; and a Remittance Advice Signature field 44 that is the MTA's digital signature over the remittance advice information.

The Issuer Signature section 14 of a ticket 8 holds a digital signature, formed by the ticket creator, over the Identifier and Components sections 10, 12. Such a signature is made using a private key belonging to the issuer's trusted agent. The Issuer Certificate section 16 contains a certification by a trusted third party (hereinafter referred to as the "Trusted Agency") used in conjunction with the issuer signature to verify the authenticity of the issued ticket 8. Such certification is in the form of a certificate belonging to the issuer's trusted agent. The general use of certificates and digital signatures is known and described, for example, in D. W. Davies and W. L. Price, Security For Computer Networks (John Wiley & Sons, 1984).

The Transfer History section 18 contains information generated when tickets are transferred between trusted agents after the initial issuing of the ticket 8 by a merchant or authority. A Receiver ID's field 28 contains the receiving trusted agent's identification number. A Sender ID's field 30 contains the sending trusted agent's identification number. A Sender Certs field 32 contains the sending trusted agent's certificate. A Date/Times field 34 contains the date and time of transfer of the ticket 8. As subsequent transfers are made, additional receiver and sender ID's, sender certificates, and dates and times are appended to each field, thus creating a list of transfer history information. It may be noted that the trusted agent ID found in the Receiver field of the Identifier section, should be the same as the first ID in the Sender ID's field.

In addition, whenever a ticket 8 is transferred between trusted agents, the sender digitally signs the ticket over the five preceding ticket sections using a private key belonging to the sender's trusted agent. The Sender Signatures section 20 is then updated by appending the newly created digital signature, thus forming a list of sender signatures.

Transaction Devices

Figure 4:
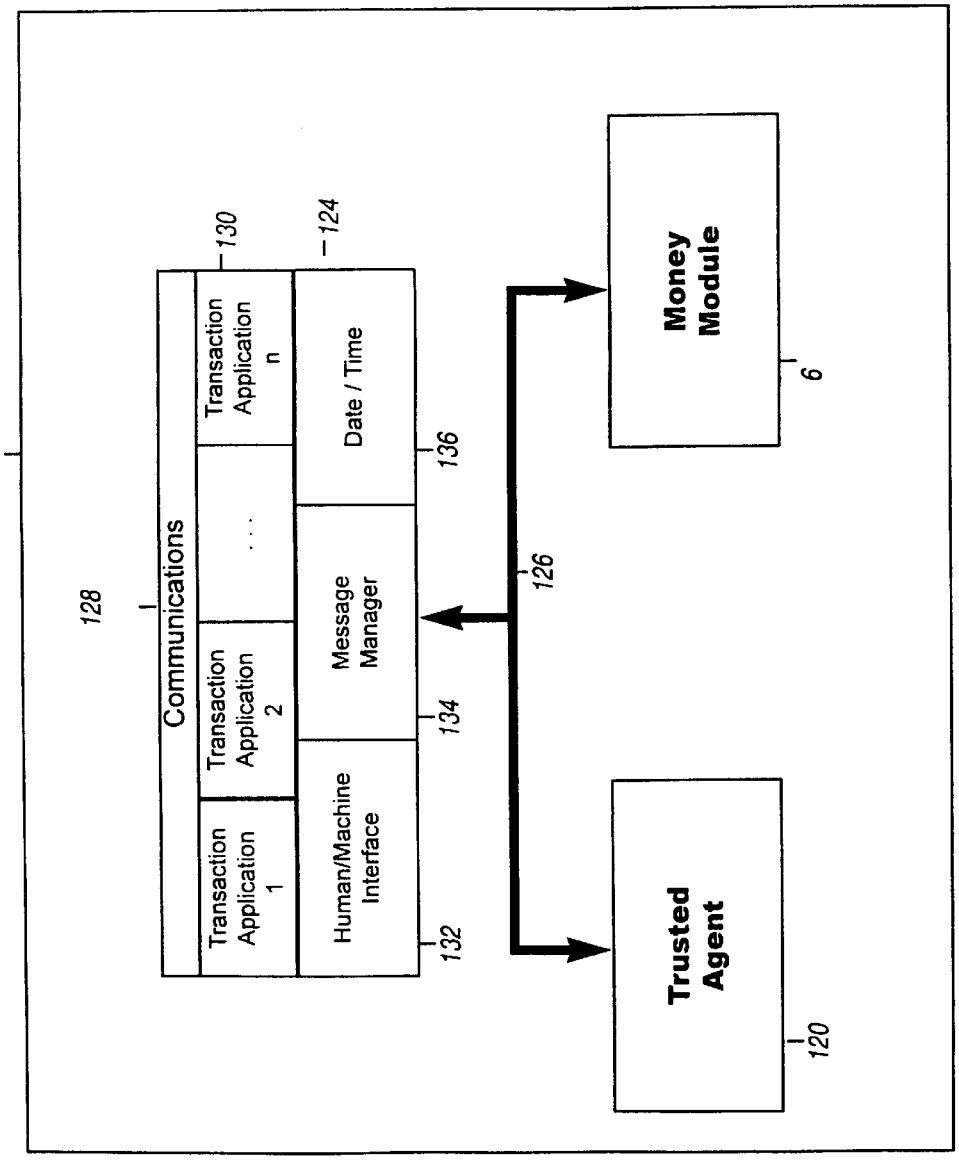
FIG. 4 illustrates the components of a transaction device.

Referring to FIG. 4, a trusted agent 120 is embedded in a transaction device 122. The transaction device 122 is composed of three major components for both the merchant and the customer. There is a host processor 124, a trusted agent 120, and a money module 6. These components are connected, for example, by a bus 126. The trusted agent and the money module have hardware and software components. The trusted agent and money module can be fabricated separately or they may be combined to reduce fabrication costs. Such a combined trusted agent and money module may share hardware components (e.g., a microprocessor, memory and clock) and software components (e.g., cryptographic functions). When trusted agent 120 is a MTA 2, the device 122 is referred to as a merchant transaction device (MTD). When trusted agent 120 is a CTA 4, the device 122 is referred to as a customer transaction device (CTD).

FIG. 4 shows the functional components of the host processor 124. The host processor provides the following functions: Communications 128, Transaction Applications 130, Human/Machine Interface 132, Date/Time 136, and a Message Manager 134.

The Communications function 128 supports communications between the transaction device 122 and the outside world. Such communications may be wired or wireless, broad or narrow band, so long as communications are compatible between the devices. The Communications function 128 sets up the connection between two transaction devices 122, or connects a transaction device to a network for indirect connection to another transaction device or a trusted server.

Transaction Applications 130 may perform a variety of tasks. For example, a transaction application may pay invoices received from prior transactions. In general, a transaction device 122 contains all the processes to choose, buy and possibly use electronic objects, electronic money, credentials, and other tickets 8, or the processes to sell the same.

The Human/Machine Interface function 132 provides the look and feel of the transaction device 122. It could include a keyboard, mouse, pen, voice, touch screen, icons, menus, etc. The Human/Machine Interface 132 communicates with other functions in the trusted agent 120 and the money module 6 through the message manager 134. In some applications a Human/Machine Interface 132 may not be necessary, for example, in a fully automated merchant or customer transaction device.

The Date/Time function 136 is set by the owner of the transaction device 122 and includes date, time and time zone. The Date/Time information is fed to the embedded trusted agent 120 whenever the trusted agent is opened for use.

The Message Manager 134 routes inter-host messages (i.e., messages between transaction devices are sent to the communications function for routing to the other host) and messages among the host processor 124, the trusted agent 120 and the money module 6.

Trusted Agents

Figure 5A:
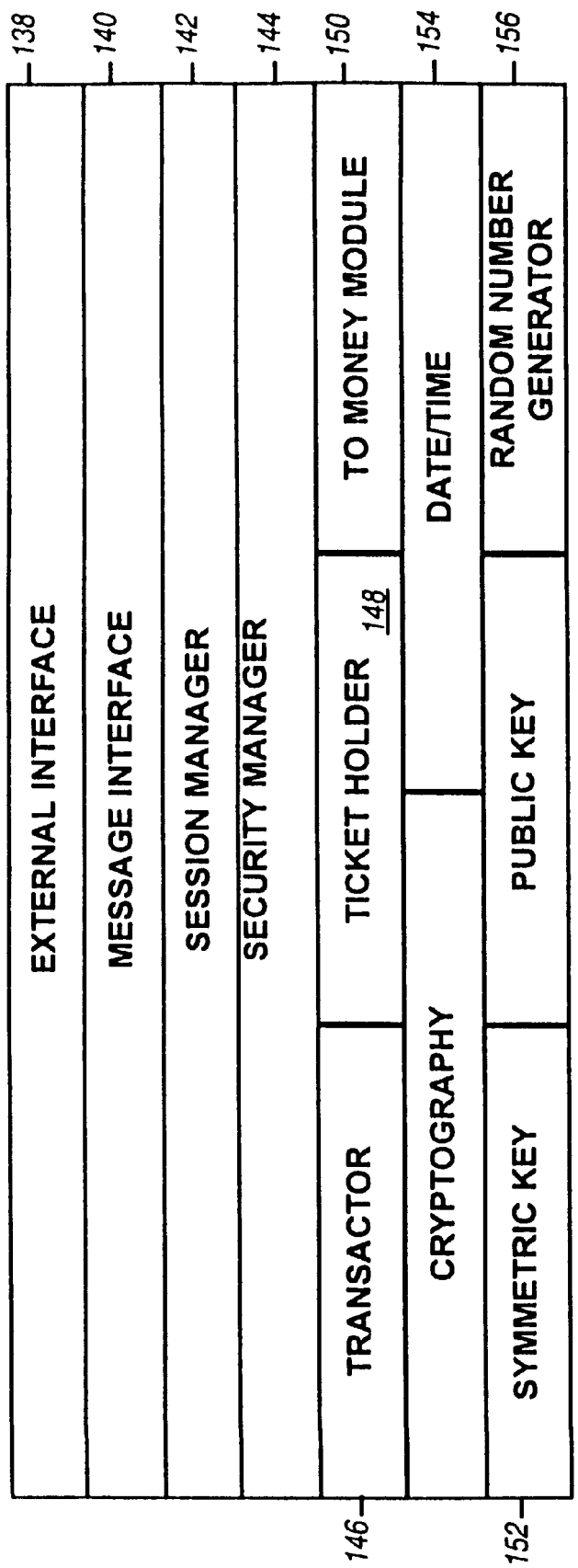
FIGS. 5A–5D illustrate the functional components of trusted agents.
Figure 5B:
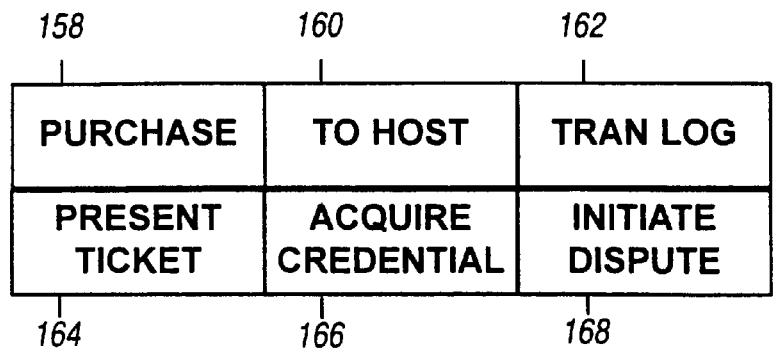
Figure 5C:
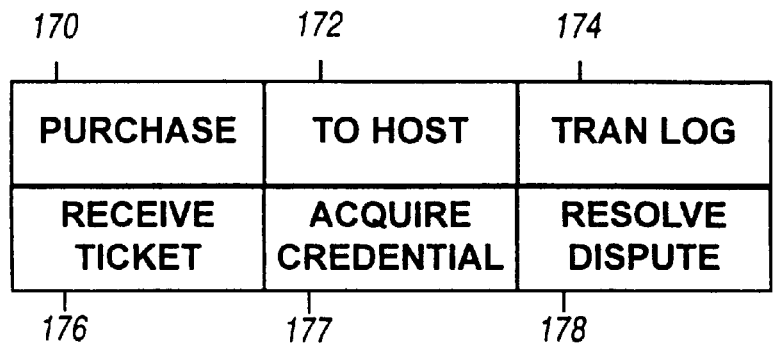
Figure 5D:
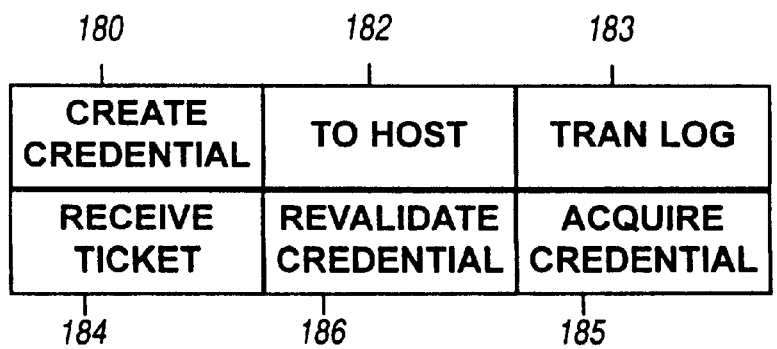

FIG. 5A shows the functional components of a trusted agent 120. The contemplated system for open electronic commerce uses three types of trusted agent 120 which differ in certain unique Transactor functions 146 that they provide. FIG. 5B shows the transactor functions found in a CTA 2. FIG. 5C shows the transactor functions found in a MTA 4. FIG. 5D shows the transactor functions found in an Authority Trusted Agent (ATA) which, in turn, is embedded in an Authority Transaction Device (ATD). ATDs are associated with credential issuing authorities such as a bank.

An External Interface function 138 provides physical communication with the host processor 124 and the money module 6 of the transaction device 122 in which the trusted agent 120 is embedded. A Message Interface function 140 processes and routes inter-agent and intra-agent messages. A Session Manager function 142 sets up and breaks down inter-agent sessions and agent to trusted server sessions. A Security Manager function 144 maintains security information (e.g., a trusted agent certificate and an untrusted agent list) and establishes secure communication with a counterparty trusted agent (via the host processor 124) and with the local money module 6 within the same transaction device 122. The Transactor function 146 provides the protocols to perform a transaction. Customer, merchant and authority transactors are used for CTAs, MTAs and ATAs, respectively.

FIG. 5B shows the customer transactor functions. A Purchase function 158 exchanges payment for tickets 8 and electronic objects. A To Host function 160 provides an interface to the transaction device's host processor 124. A Present Ticket function 164 presents tickets 8 to obtain information or services. An Acquire Credential function 166 interacts to receive a credential ticket. A Tran Log function 162 maintains a log of trusted agent transactions. Both CTAs 2 and MTAs 4 maintain a transaction log which stores the following information: transaction type (e.g., ticket type); a pre-transaction ticket image; a post-transaction ticket image; dispute information including the date of dispute (as maintained by each trusted agent in the dispute dialog), status, and merchant resolution (e.g., replace, refund, denied); and recertifying information (e.g., date of recertification). An Initiate Dispute function 168 presents electronic merchandise if a customer is dissatisfied.

FIG. 5C shows the merchant transactor functions. A Purchase function 170 exchanges tickets 8 and electronic objects for payment. A To Host function 172 provides an interface to the transaction device's host processor 124. A Receive Ticket function 176 processes a received ticket 8 to provide service or information. An Acquire Credential function 177 obtains a merchant credential. A Tran Log function 174 maintains a log of trusted agent transactions. A Resolve Dispute function 178 receives tickets 8 and electronic objects to resolve a customer complaint.

FIG. 5D shows the authority transactor functions. A Create Credential function 180 constructs and delivers credential tickets to a requester. A To Host function 182 provides an interface to the transaction device's host processor 124. A Receive Ticket function 184 processes a received ticket 8 to provide service or information. A Revalidate Credential function 186 accepts a current credential and reissues the credential with a new expiration date. A Tran Log function 183 maintains a log of transactions. An Acquire Credential function 185 obtains an authority credential.

Referring again to FIG. 5A, a To Money Module function 150 communicates with the money module 6 in the same transaction device 122 to provide payment. A Cryptography function 152 provides public key and symmetric key cryptographic functions. Any public key cryptography technique (e.g., RSA, ElGamal (e.g., Ellipitic curve)) and symmetric key cryptography technique (e.g., Triple DES, RC-5, IDEA) may be used. A Ticket Holder function 148 creates tickets 8 in a MTA 4 or stores and retrieves tickets 8 in a CTA 2. A Random Number Generator function 156 generates random numbers to produce cryptographic keys. A Date/Time function 154 manages the date and time delivered from the host processor 124 to date tickets 8 and validate certificates and presented tickets. Current clock information is fed to the trusted agent 120 every time the trusted agent is opened (i.e., signed on for use) and maintained until the trusted agent is closed.

The trusted agent/money module hardware may consist of the following: a microcontroller (e.g., the Advanced Risk Machine (ARM) family) for executing the transaction protocols; a high-speed volatile memory (e.g., SRAM) for storing the operating system, parts of the applications, cryptography, etc. during execution; a non-volatile memory (e.g., flash memory) for storing the operating system, applications, tickets, electronic money, logs, etc.; an integrated circuit clock for providing a time reference; a battery for the clock; and a noisy diode or other random source for a random number generator.

Network Overview

Figure 6:
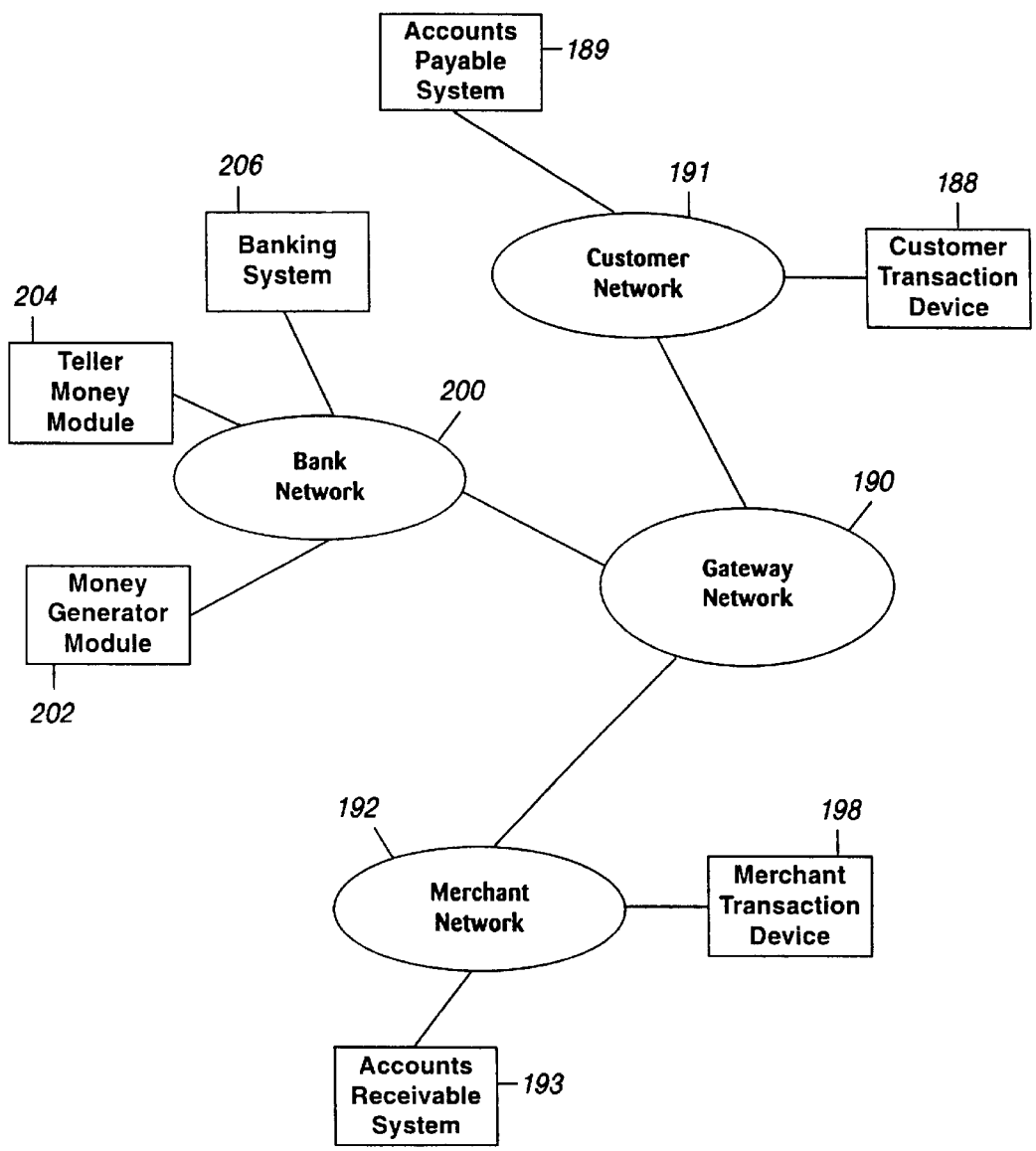
FIG. 6 is a diagram showing the network structure for the system of the present invention.

FIG. 6 shows the general network architecture of the contemplated system for party-to-party presentment with payment on demand. Merchant Transaction device 198 communicates with the merchant's accounts receivable system 193 via merchant network 192. The accounts receivable system 193 sends invoicing data to the host processor of MTD 198 which provides invoice and/or past due notice information to the merchant trusted agent 2 for presentment. The MTD 198 can connect with a CTD 188 via a gateway network 190 (e.g., the internet) and a customer network 191. Customer network 191 provides communications for CTD 188 and accounts payable system 189.

After presentment and once a payment decision is made, the CTD 188 ensures that its money module 6 has sufficient funds for payment or obtains electronic money from another transaction device or withdraws the electronic money from a bank as, for example, described in my U.S. Pat. No. 5,453,601 and my co-pending U.S. patent application Ser. No. 08/427,287. In such a bank withdrawal CTD 188 would connect to a teller module 204 via customer network 191, a gateway network 190 and a bank network 200. The teller module 204 would request the electronic money from a money generator module 202, and banking system 206 would maintain the appropriate accounting for the withdrawal transaction.

Flow Charts

The flow charts shown in the following figures use the designations "A" and "B" to indicate two interacting trusted agents 120. The same designations A and B, may also be applied to the host processor 124 or money module 6 associated with a particular trusted agent 120 (i.e., within the same transaction device 122). The flow charts indicate the functional component primarily responsible for carrying out a given task. For example, SECURITY MANAGER A means that the recited task is carried out by the Security Manager function 144 (see FIG. 5A) in trusted agent A.

The flow charts also call subroutines some of which use parameter designations X and Y. For example, ESTABLISH SESSION A→B is a call to the subroutine Establish Session. The Establish Session flow chart should then be followed with the understanding that X=A and Y=B throughout the flow.

Abort and Commit

In transaction processing of the type contemplated it is desirable to pass electronic items such as tickets 8 and electronic notes between two parties, while maintaining a zero-sum game. In other words, it is undesirable to duplicate electronic items so that at the completion of an electronic transaction there are twice as many items as before the transaction. Similarly, it is undesirable to lose electronic items so that there are fewer items after the transaction than before. For example, if at the start of a transaction A has an electronic ticket 8 and wishes to pass it to B, then it is desirable to ensure that at the end of the transaction, B has the electronic ticket 8 and A does not have the electronic ticket. In the real world, however, it is possible to have two other outcomes, namely, both A and B have the same electronic ticket 8 (duplication) or neither A nor B have the electronic ticket 8 (loss).

In order to render the likelihood of duplication or loss negligible, the transaction protocol must take into account the possibility that natural or intentional events may interrupt a typical transaction flow. A natural interruption is exemplified by a breakdown of the communications link between A and B during the transaction. To minimize the possibility of duplication or loss from such a random event the window of opportunity for creating a duplication or loss must be minimized. In order to minimize intentional interruptions (i.e., overt attacks), it is desirable to eliminate the economic incentive for such an attack. For example, if an attacker could only lose the tickets and or the money by trying to interrupt a transaction, the attacker would have no incentive to initiate the attack in the first place.

These concepts are embodied in the efficient transaction protocols of the described system. In particular, it is desirable to ensure consistent abort and commit states between the two transacting trusted agents 120 (or money modules 6). For example, if A commits to a transaction, then B should also commit to the transaction; or, if A aborts the transaction, then B should also abort the transaction. To achieve consistency and minimize the possibility of duplication or loss (in the event there is an inconsistency) the transaction protocols take into account the order and timing of A's and B's committing to a given transaction.

FIG. 7 shows two subroutines, Abort and Commit. The abort subroutine is internally executed within a given trusted agent 120 when the transaction it is involved in fails. The abort subroutine rolls back or returns the trusted agent 120 to the exact state it was in prior to being involved with the failed transaction. In addition, if the merchant trusted agent aborts after an authorization, then the authorization will be reversed. Conversely, the commit transaction is internally executed within a given trusted agent 120 when the transaction it is involved in has been successfully completed. The trusted agent 120 therefore records the completed transaction in its transaction log and is now ready for a new transaction. For example, during a ticket transfer transaction an electronic ticket 8 is passed from trusted agent A to trusted agent B. Since at this point in time neither A nor B have committed or aborted the transaction, A provisionally retains the ticket 8 while B provisionally also has the ticket 8. If both A and B commit then A will delete its ticket 8, and B's retention of the ticket 8 will no longer be provisional. If, however, both A and B abort then A will retain its ticket 8 and the ticket 8 that B was retaining provisionally will be deleted by rolling back the transaction. Note that the deletion operation may be implemented in various ways well known in the art. As mentioned before, it is desirable to minimize the possibility of one trusted agent 120 committing while another trusted agent 120 aborts because this may in some limited circumstances result in duplicating or losing electronic items.

A similar situation exists with respect to money modules 6 exchanging electronic notes. During a purchase transaction, electronic notes are passed from money module A to money module B, so that A provisionally decrements its electronic notes (by the amounts transferred) while B provisionally has electronic notes (in the transferred amount). If both A and B commit then A will retain the notes in the decremented amounts and B's retention of the electronic notes will no longer be provisional.

Figure 7A:
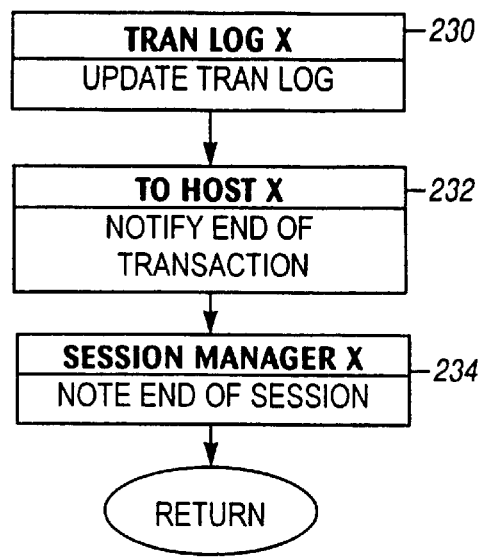
FIG. 7A illustrates a Commit protocol.

FIG. 7A shows the commit subroutine. Tran Log X updates the transaction log. To Host X notifies the host that the transaction is complete. Session Manager X notes the end of the session. (Steps 230–234).

Figure 7B:
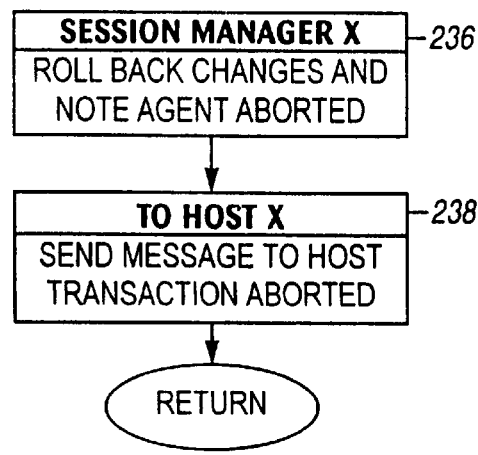
FIG. 7B illustrates an Abort protocol.
Figure 8A:
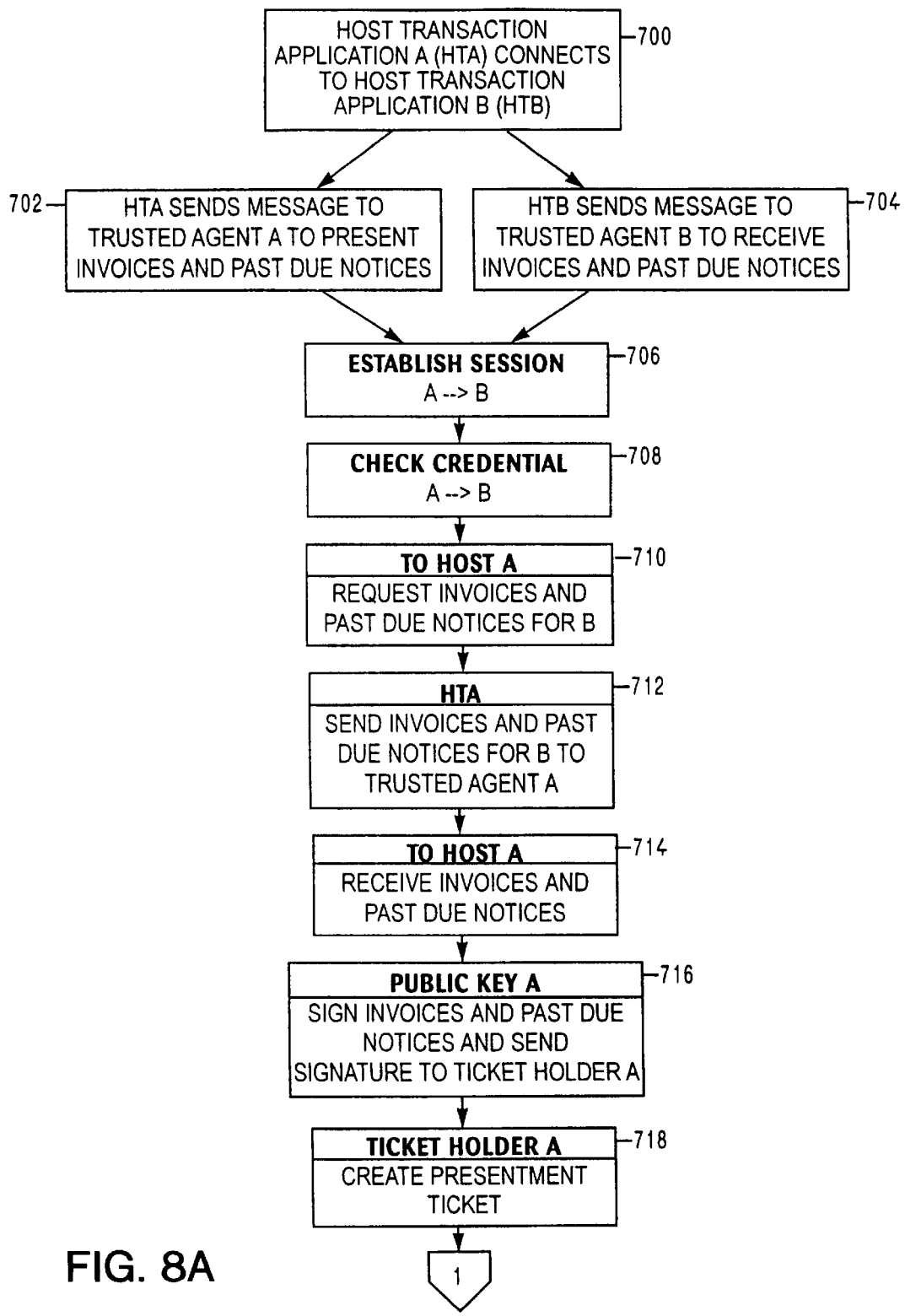
FIGS. 8A–8J illustrate a Presentment With Payment On Demand.
Figure 8B:
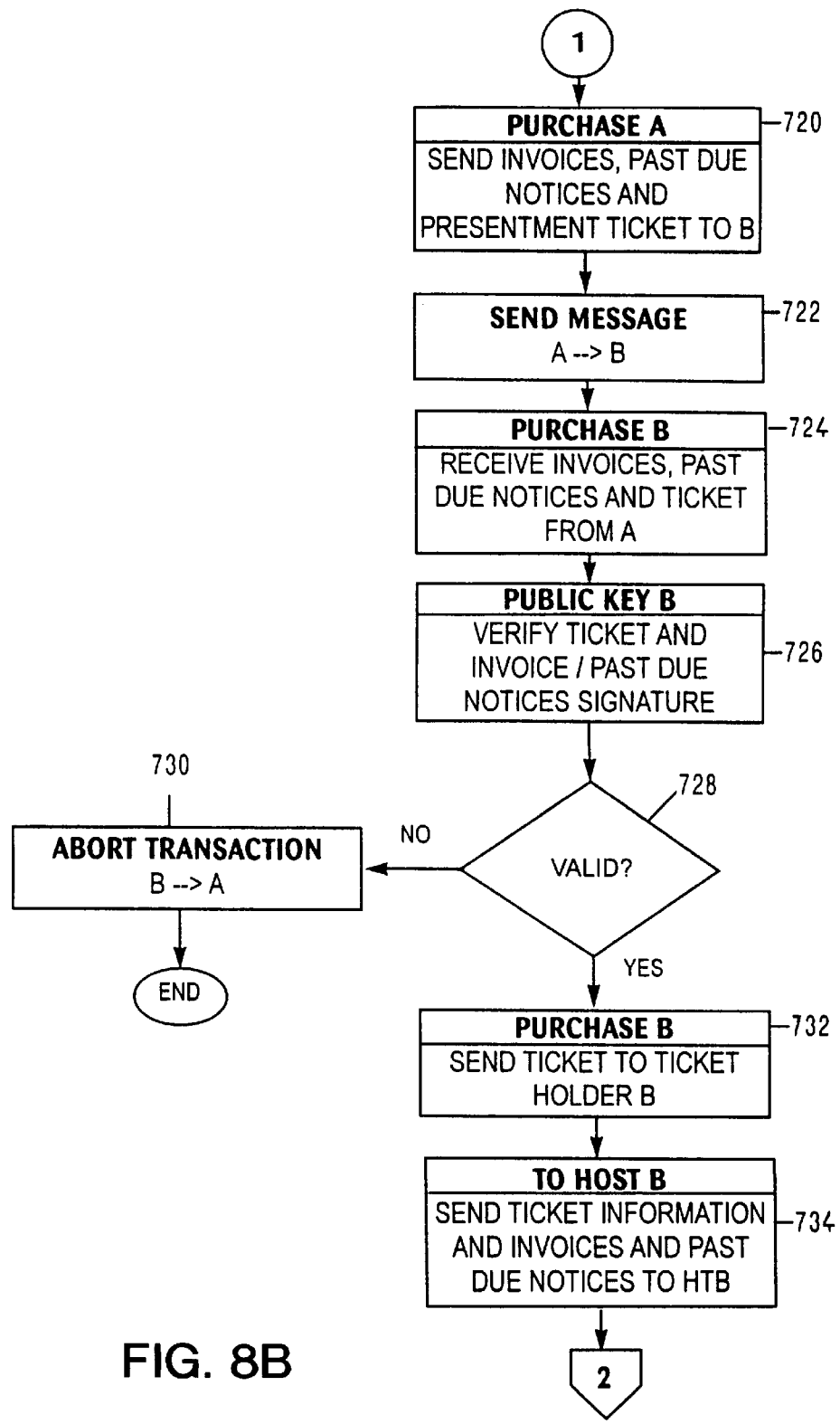
Figure 8C:
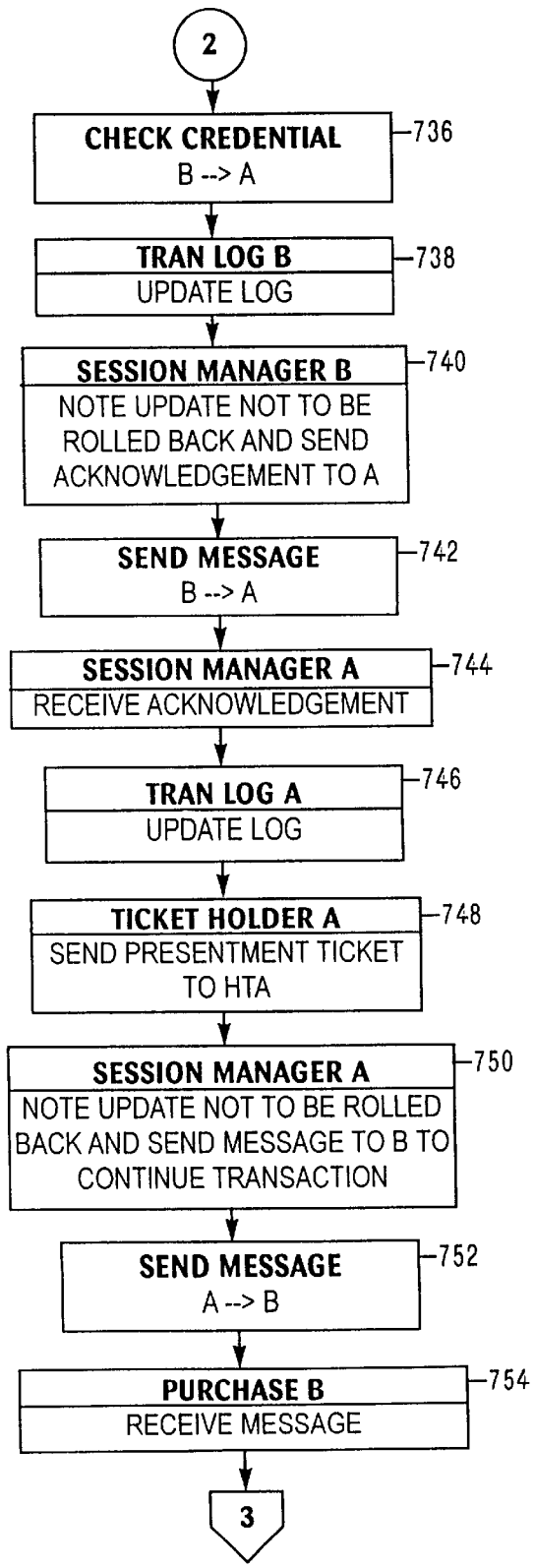
Figure 8D:
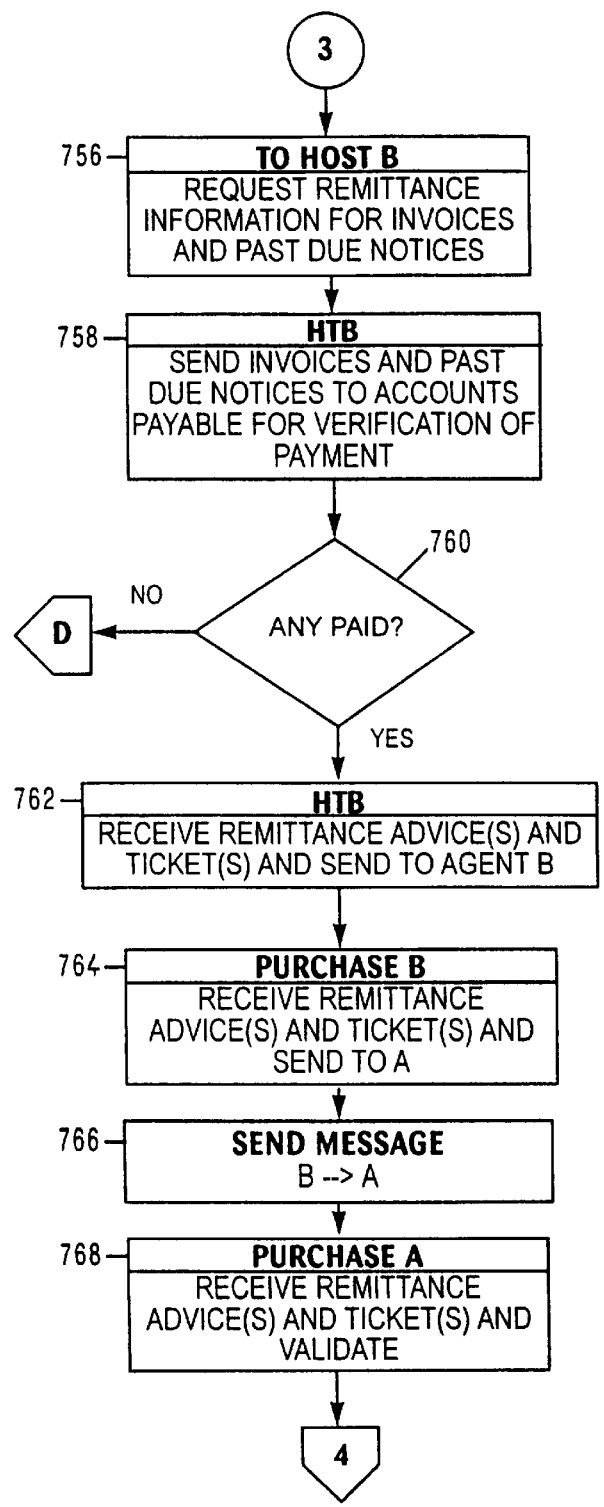
Figure 8E:
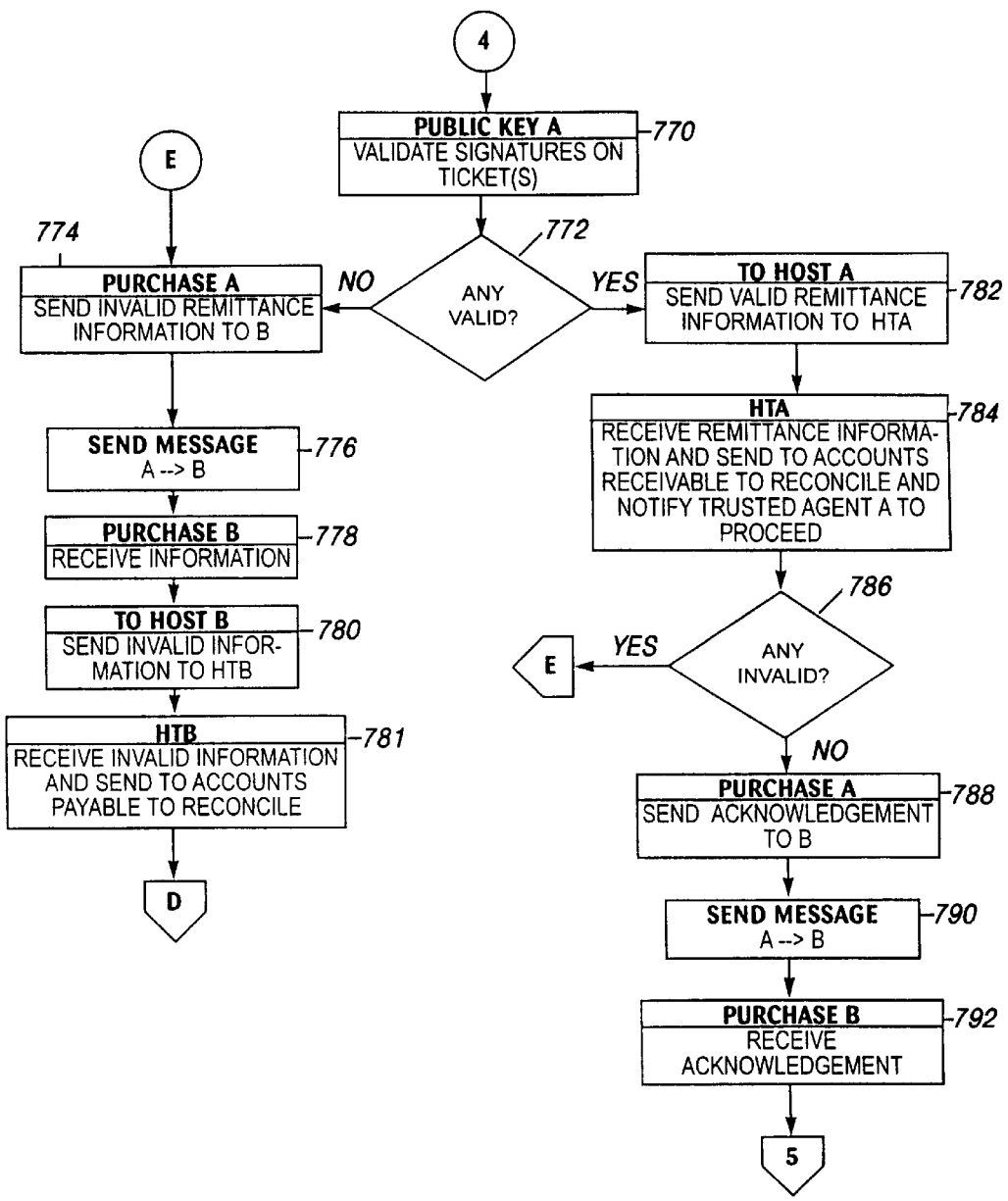
Figure 8F:
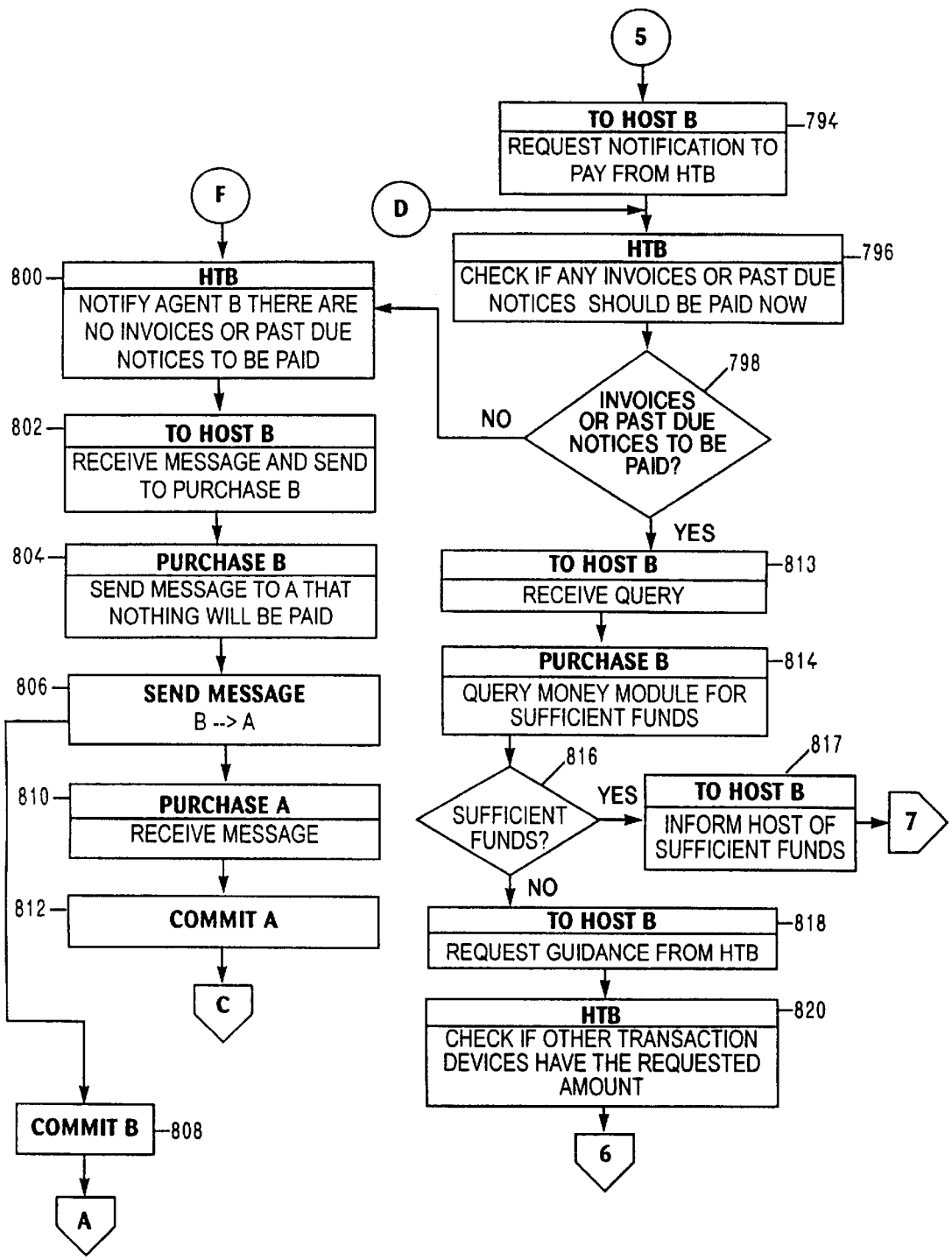
Figure 8G:
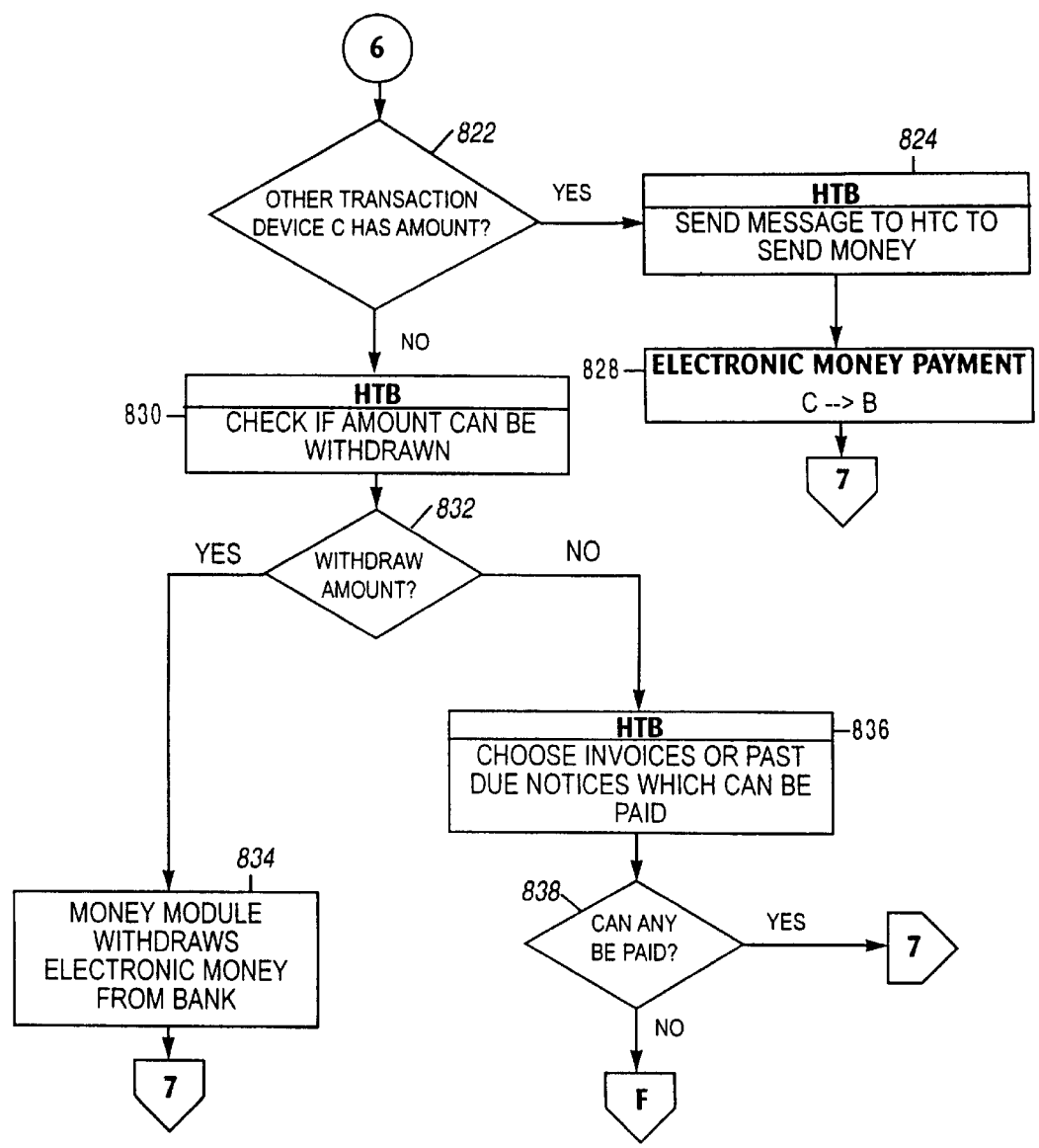
Figure 8H:
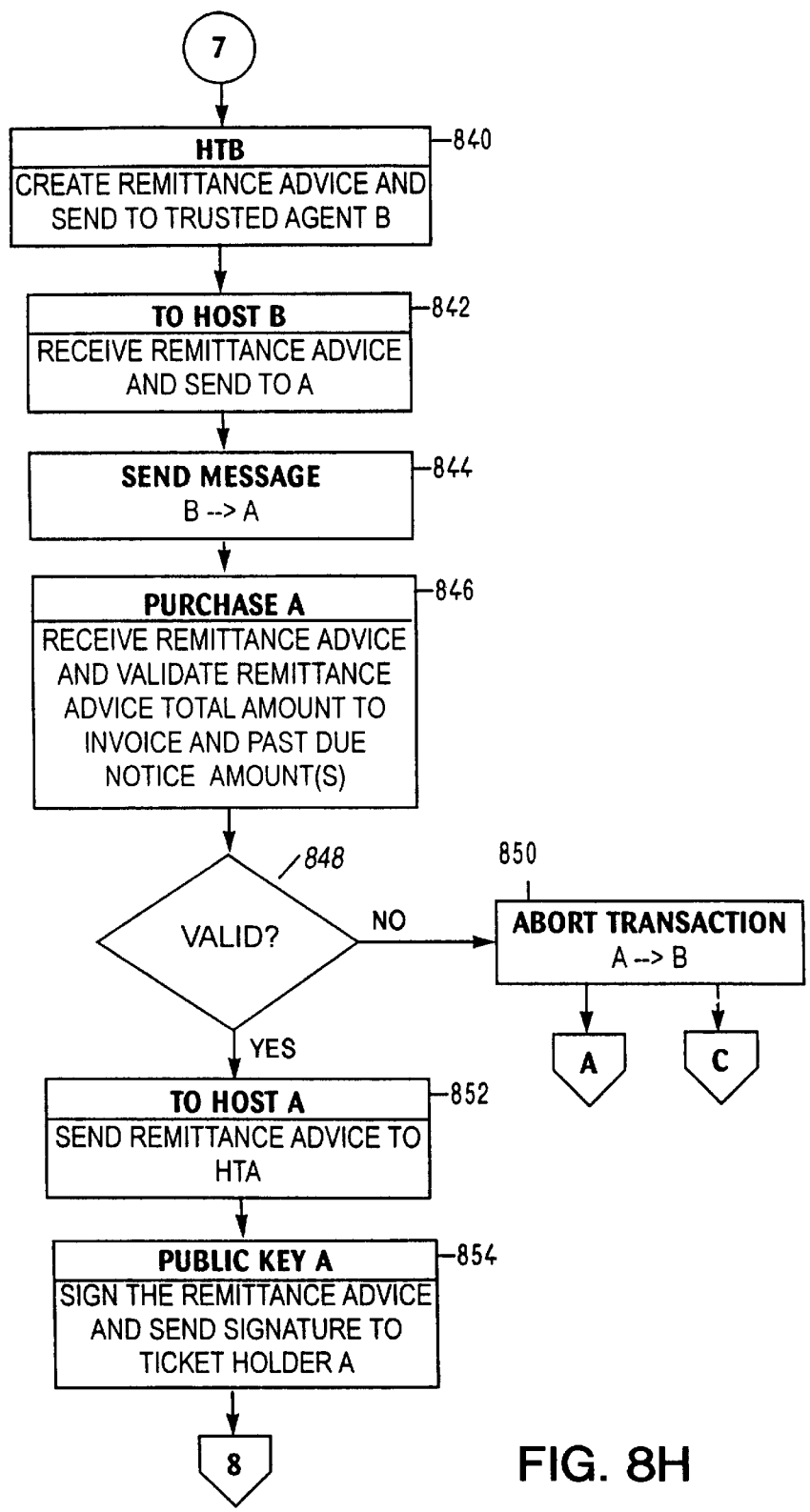
Figure 8I:
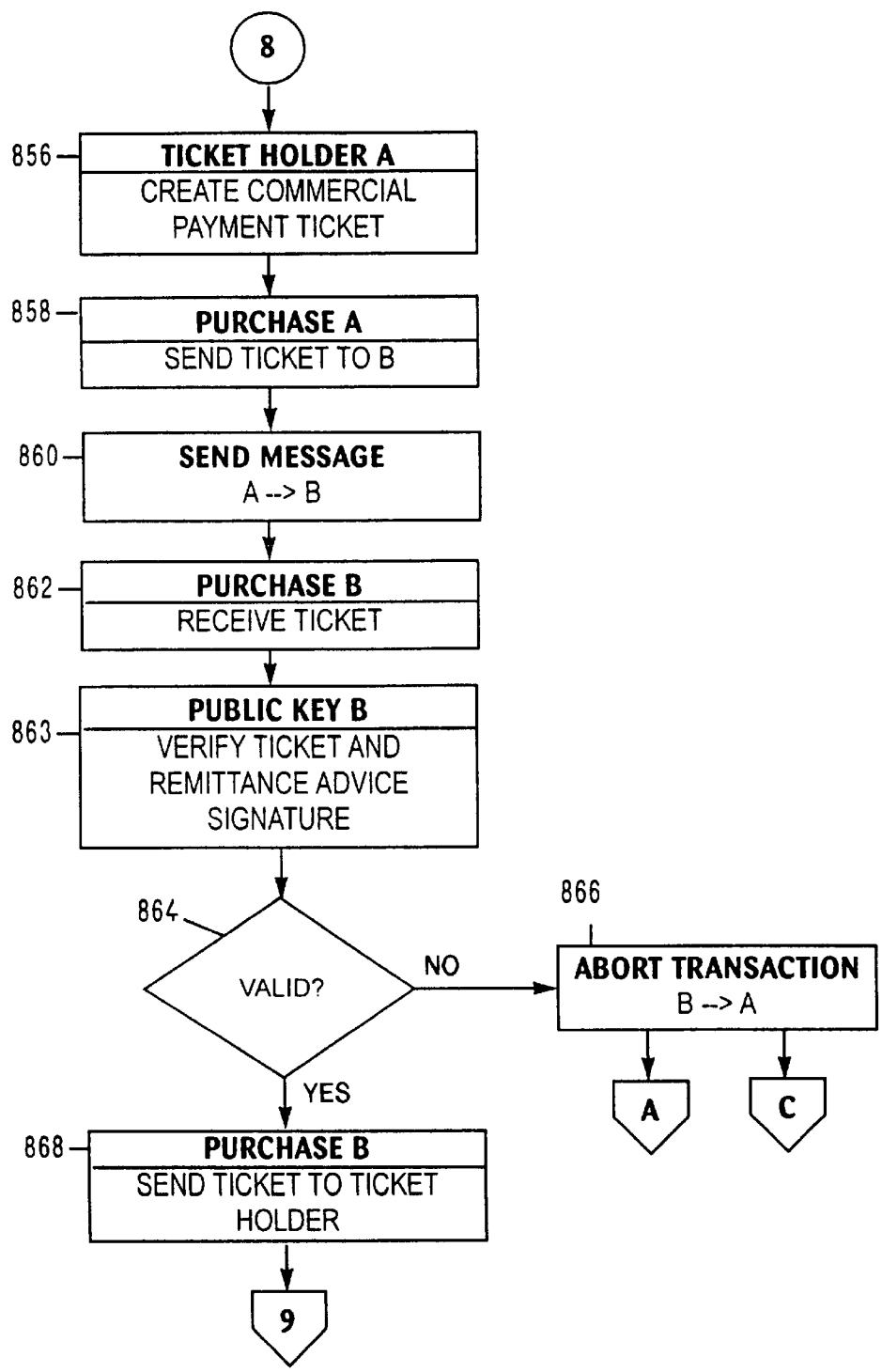
Figure 8J:
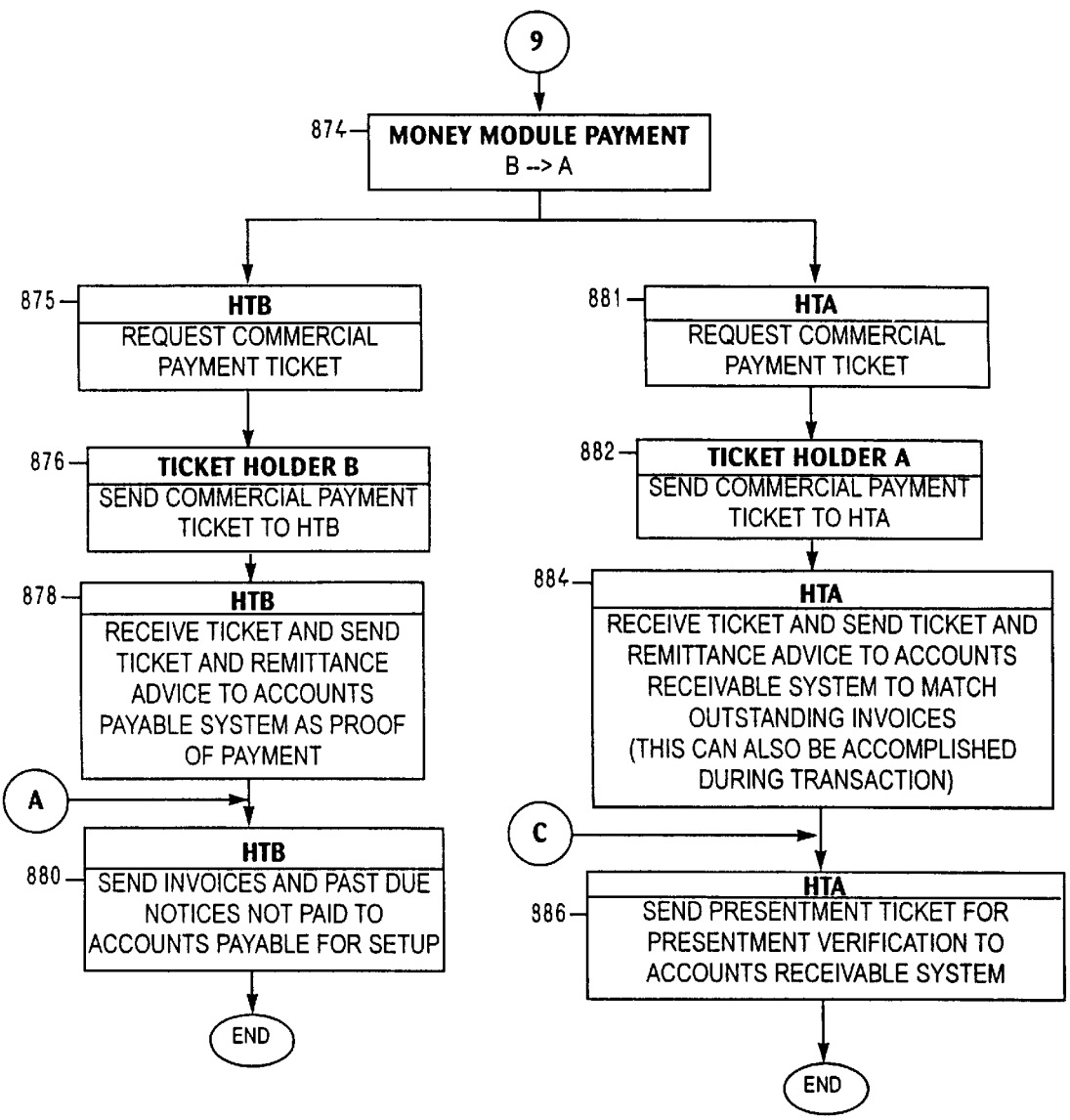
Figure 9A:
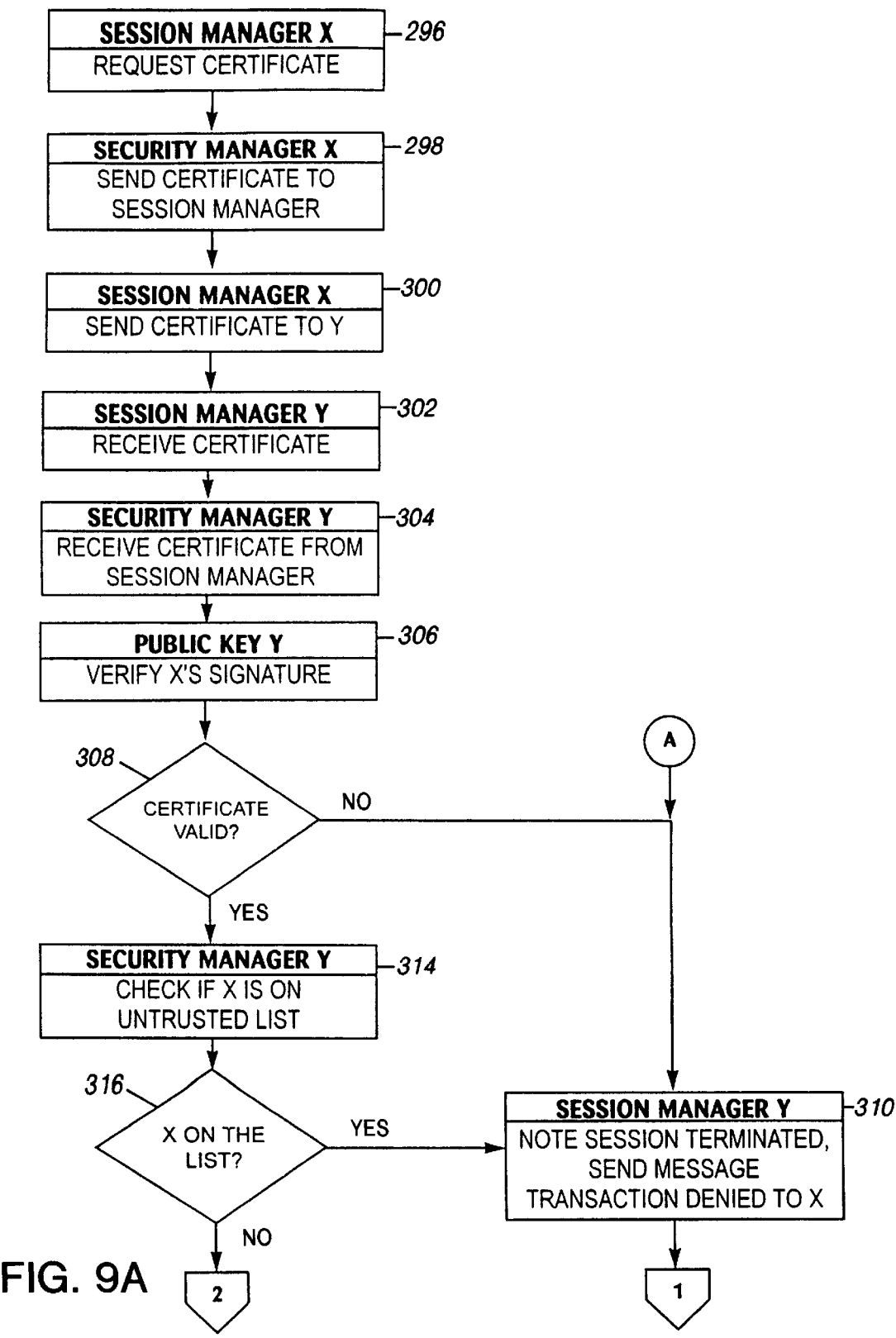
FIGS. 9A–9E illustrate an Establish Session protocol.
Figure 9B:
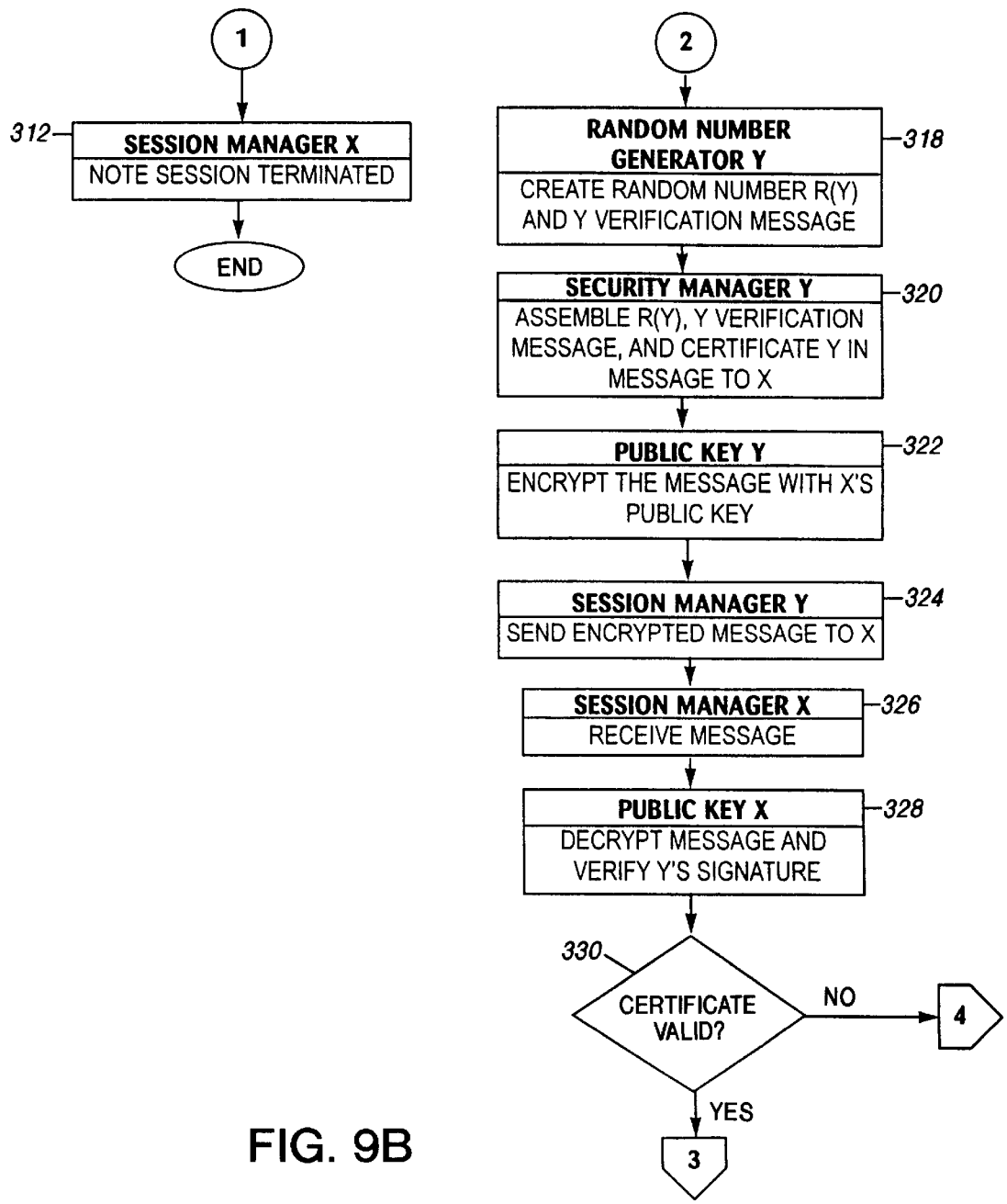
Figure 9C:
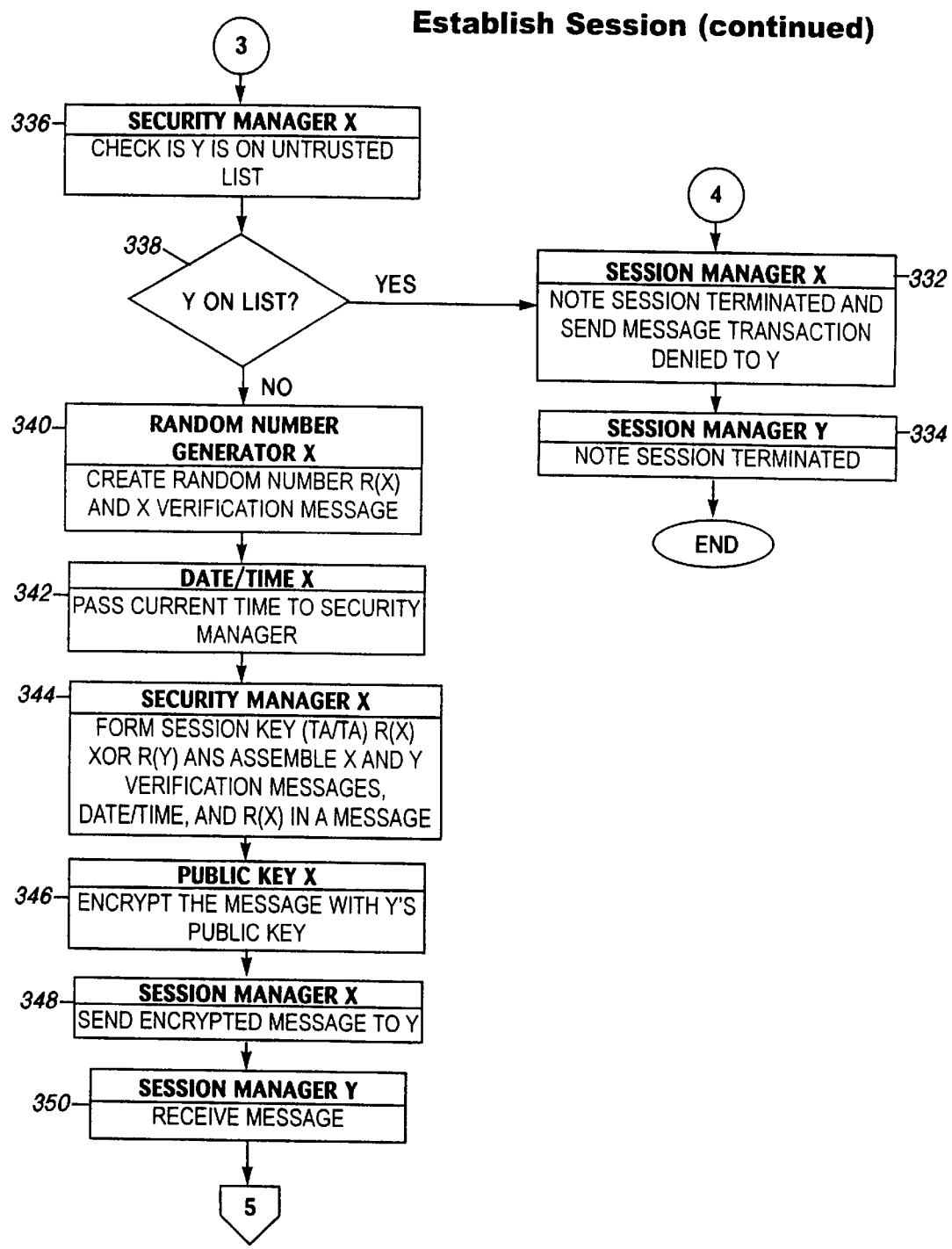
Figure 9D:
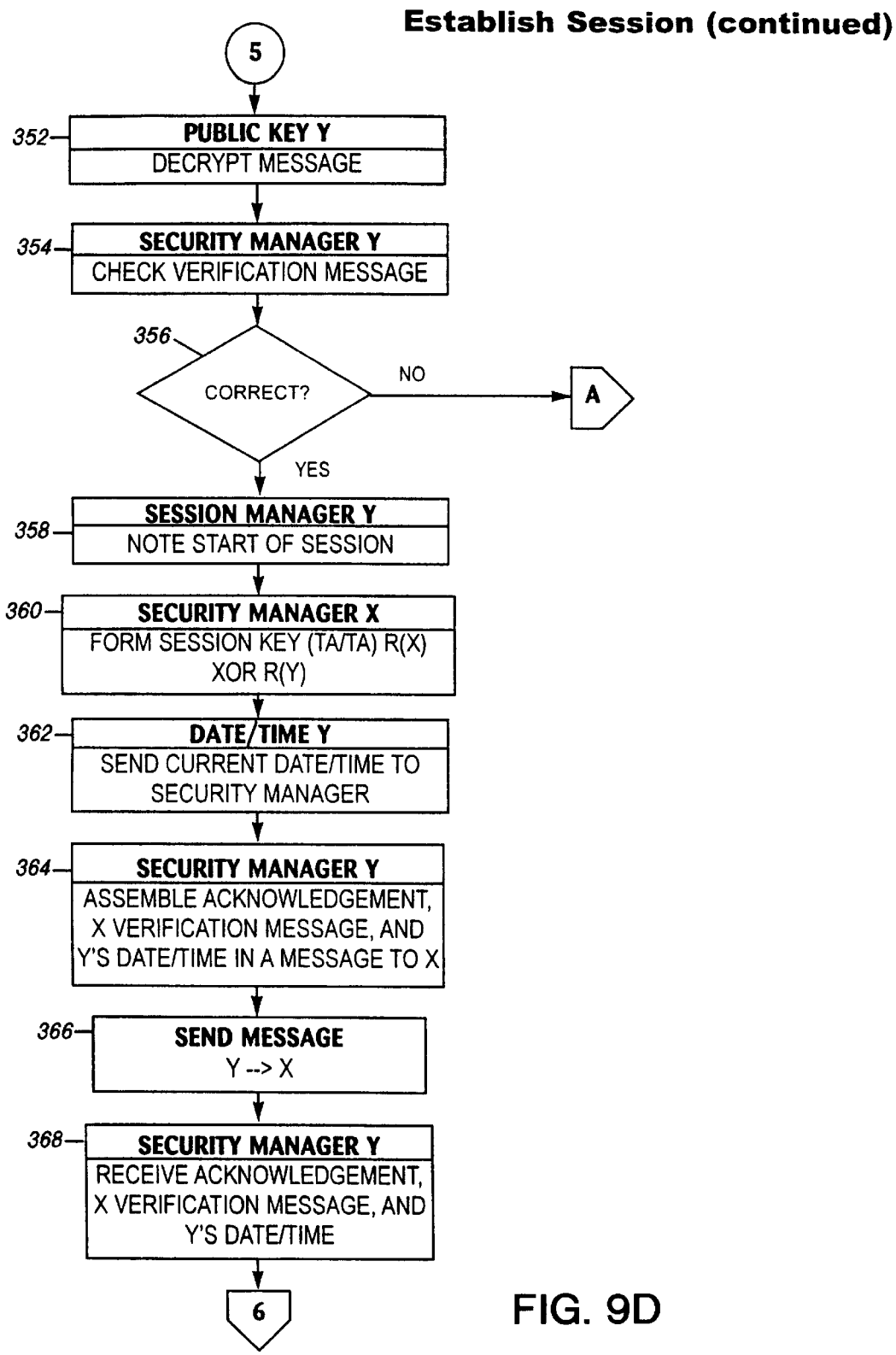
Figure 9E:
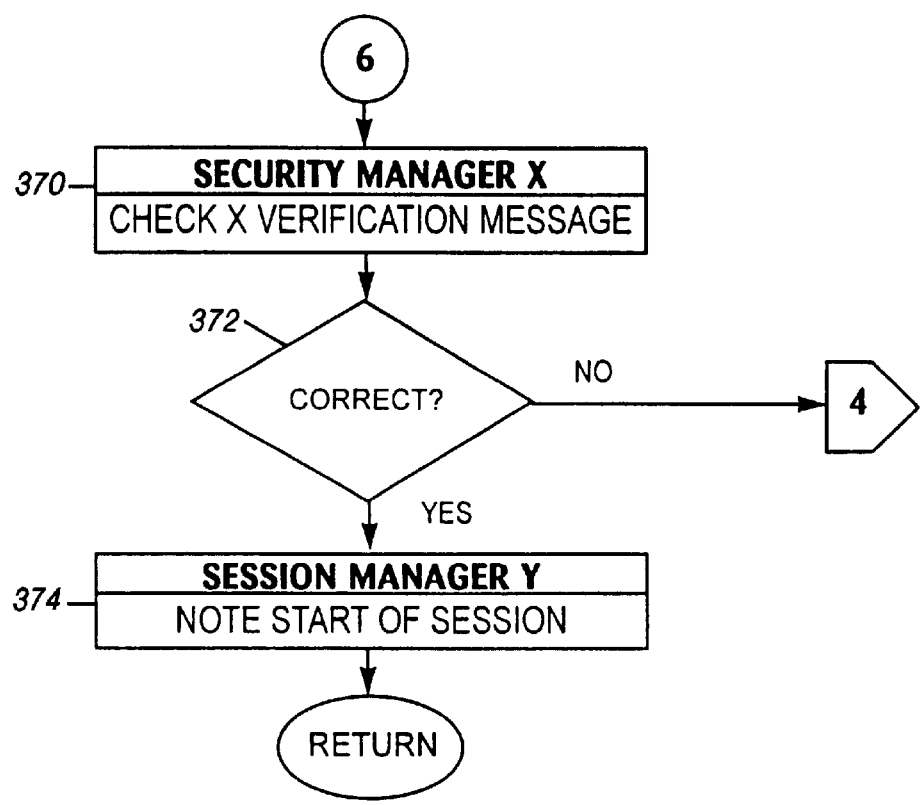

FIG. 7B shows the abort subroutine. Session Manager X rolls back changes and notes agent aborted. The Session Manager keeps track of what has been done since the start of a session and when rolling back undoes these steps. To Host X sends a message to the host that the transaction is aborted. (Steps 236–238).

The abort subroutine may be called directly from a flow diagram, for example, when a trusted agent 120 determines that a certificate is not valid. The abort subroutine may also be called when an expected action does not occur. In particular, when two trusted agents 120 are communicating, they will be monitoring a time-out protocol. For example, after a first trusted agent 120 has sent a message to a second trusted agent 120, the Session Manager of the first trusted agent (A) will set a timer for a reply if a reply is required. The Session Manager may also number the message sent. This number would appear in the reply message from the Session Manager of the second trusted agent (B).

If the timer expires before the message has been received, then Session Manager A will query Session Manager B to determine if the transaction is still running in B. If B does not reply then Session Manager A will abort the transaction. If a reply is received that the transaction is proceeding, then the timer will be reset to a new time. If A queries B a predetermined number of times without receiving a reply to the original message, then A will abort the transaction. A similar time-out function exists in the money modules 6.

Presentment with Payment on Demand

FIG. 8 shows the flow chart for a party-to-party presentment of invoices and/or past due notices with an integrated, real time money module payment. Initially, invoice and past due notice information from an accounts receivable system 193 or other automated invoicing or collections system is sent to the host of MTD 198. Though both accounts receivable system 193 and accounts payable system 189 are preferably automated systems, the teachings of the present invention likewise apply to manual systems (e.g., where invoicing/remittance data is keyed into the hosts of MTD 198 and CTD 188). To commence presentment, host transaction application A (HTA) connects to host transaction application B (HTB) preferably via merchant network 192, gateway network 190, and customer network 191 (step 700). HTA sends a message to its trusted agent A to present invoices and/or past due notices, and HTB sends a message to its trusted agent B to receive invoices and/or past due notices (steps 702–704).

The merchant's and customer's trusted agents (A and B) then establish a session as described in my U.S. Pat. No. 5,557,518. In particular, an Establish Session subroutine is called (step 706) for setting up a cryptographically secure communication channel between trusted agent A and trusted agent B.

Referring to FIG. 9, the Session Manager of trusted agent A requests and then receives A's certificate (i.e., cert(TA)) from the Security Manager (steps 296–298). Session Manager A then sends cert(TA) to trusted agent B's Session Manager which, in turn, passes it along to its Security Manager (steps 300–304).

Trusted agent B's Public Key function verifies the cert (TA) by using the validation protocols such as those discussed in U.S. Pat. No. 5,557,518 and co-pending U.S. application Ser. No. 08/427,287 (steps 306–308).

If cert(TA) is not valid, then Session Manager B notes that the session is terminated and informs Session Manager A that the transaction is denied. Session Manager A also notes that the session is terminated. (Steps 310–312). If cert(TA) is valid, then Security Manager B checks if trusted agent A is on the untrusted list (steps 314–316). If trusted agent A is untrusted, then the session is terminated (steps 310–312).

If A is not on the untrusted list, then Random Number Generator B creates a random number R(B) and also a B verification message (step 318). The random number R(B) will eventually be used to form a session key. The B verification message is a random number used by B to protect against message replay. Next, Security Manager B assembles R(B), the B verification message, and cert(TA) into a message for trusted agent A (step 320). Public Key B encrypts the message using trusted agent A's public key (TA(PK)) which trusted agent B received with A's cert(TA) (step 322). Session Manager B sends the encrypted message to A's Session Manager (steps 324–326).

Public Key A decrypts the message using its private key (corresponding to its public key) and verifies the validity of cert(TA) (steps 328–330). If cert(TA) is invalid, then Session Manager A notes the session as terminated and sends a transaction denial message to B whose Session Manager also notes the session as terminated (steps 332–334). If cert (TA) is valid, then Security Manager A checks if trusted agent B is on the untrusted list (steps 336–338). If trusted agent B is on the list, the session is terminated (steps 332–334).

If B is not on the untrusted list, then Random Number Generator A creates a random number R(A) and an A verification message (e.g., another random number) (step 340). The Date/Time function passes the current date and time to the Security Manager (step 342). Dates and times are exchanged by A and B for eventual recording in their trans logs during commits. Security Manager A then forms and stores session key (TA/TA) by exclusive ORing random numbers R(A) and R(B) (step 344). Session key (TA/TA) is used to encrypt communications between two trusted agents 120. Session Manager A assembles a message containing the A and B verification messages, the date/time information, and R(A) (step 344). Public Key A encrypts the message with trusted server B's public key (received by A in cert (TA)) and sends the encrypted message to trusted server B's Session Manager (steps 346–350).

Public Key B decrypts the received message using its secret key (corresponding to its public key) (step 352). Security Manager B checks if the B verification message received from A is the same B verification message it previously sent to A (steps 354–356). If it is not the same, then the session is terminated (steps 310–312). If it is the same, then Session Manager B notes the start of the session (step 358).

Security Manager B forms session key (TA/TA) by R(A) XOR R(B) and then stores the session key (step 360). At this point, both A and B have created and stored the same session key (i.e., session key (TA/TA)) to be used for their current interaction. Next, Date/Time B sends its current date and time information to Security Manager B (step 362). Security Manager B assembles a message having an acknowledgement to A, the A verification message, and B's date/time information (step 364). The Send Message subroutine is then called (step 366) for sending the message from B to A.

Figure 10:
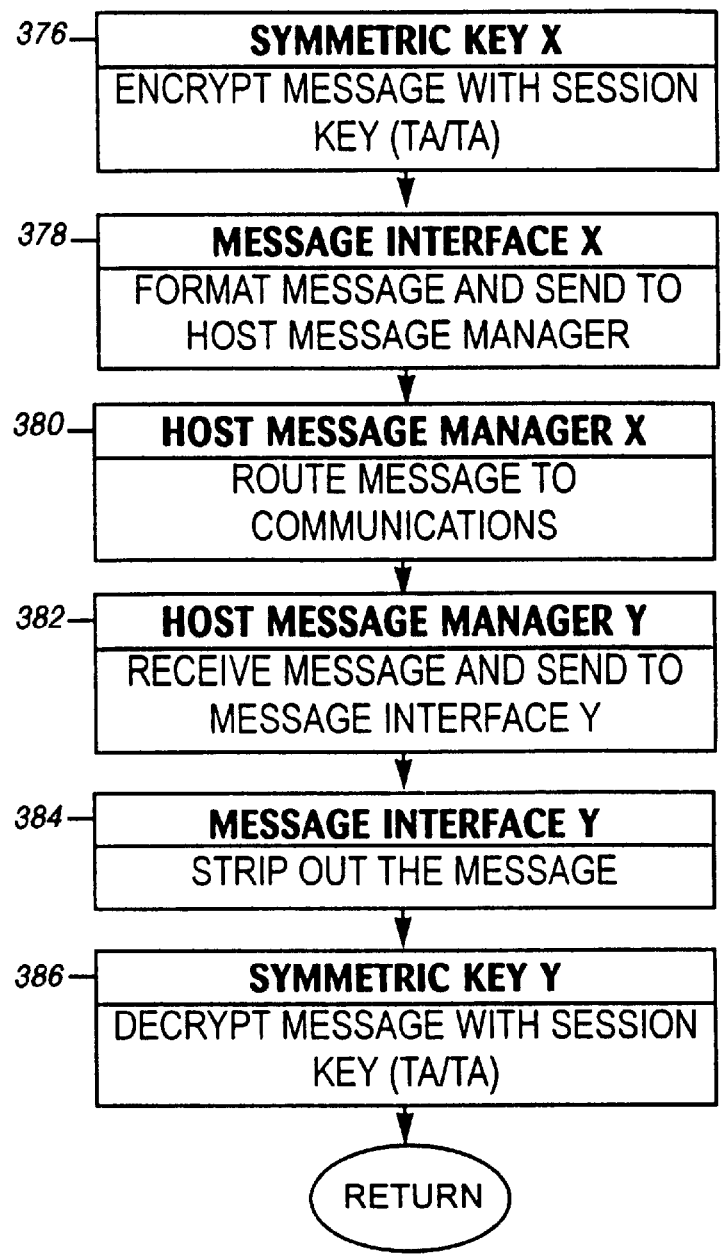
FIG. 10 illustrates a Send Message protocol.

Referring to FIG. 10, trusted agent B's Symmetric Key function encrypts the message using session key (TA/TA) (step 376). Message Interface B then formats the message and sends it to the host processor's Message Manager (step 378). Host Message Manager B then routes the message via Communications to Host Message Manager A in trusted agent A's host processor (step 380). Host Message Manager A then sends the message to trusted agent A's Message Interface which strips out the message (steps 382–384). Symmetric Key A decrypts the message with session key (TA/TA) thus completing the secure communication of a message between trusted agent and trusted agent using session key (TA/TA) (step 386).

Referring again to FIG. 9, Security Manager A receives the acknowledgement, A verification message and B's date/time information (step 368). Security Manager A checks if the A verification message is the same A verification message which A previously sent to B (steps 370–372). If it is not the same, then Session Manager A terminates the session (steps 332–334). If it is the same, then Session Manager A notes the start of the session (step 374).

Figure 11:
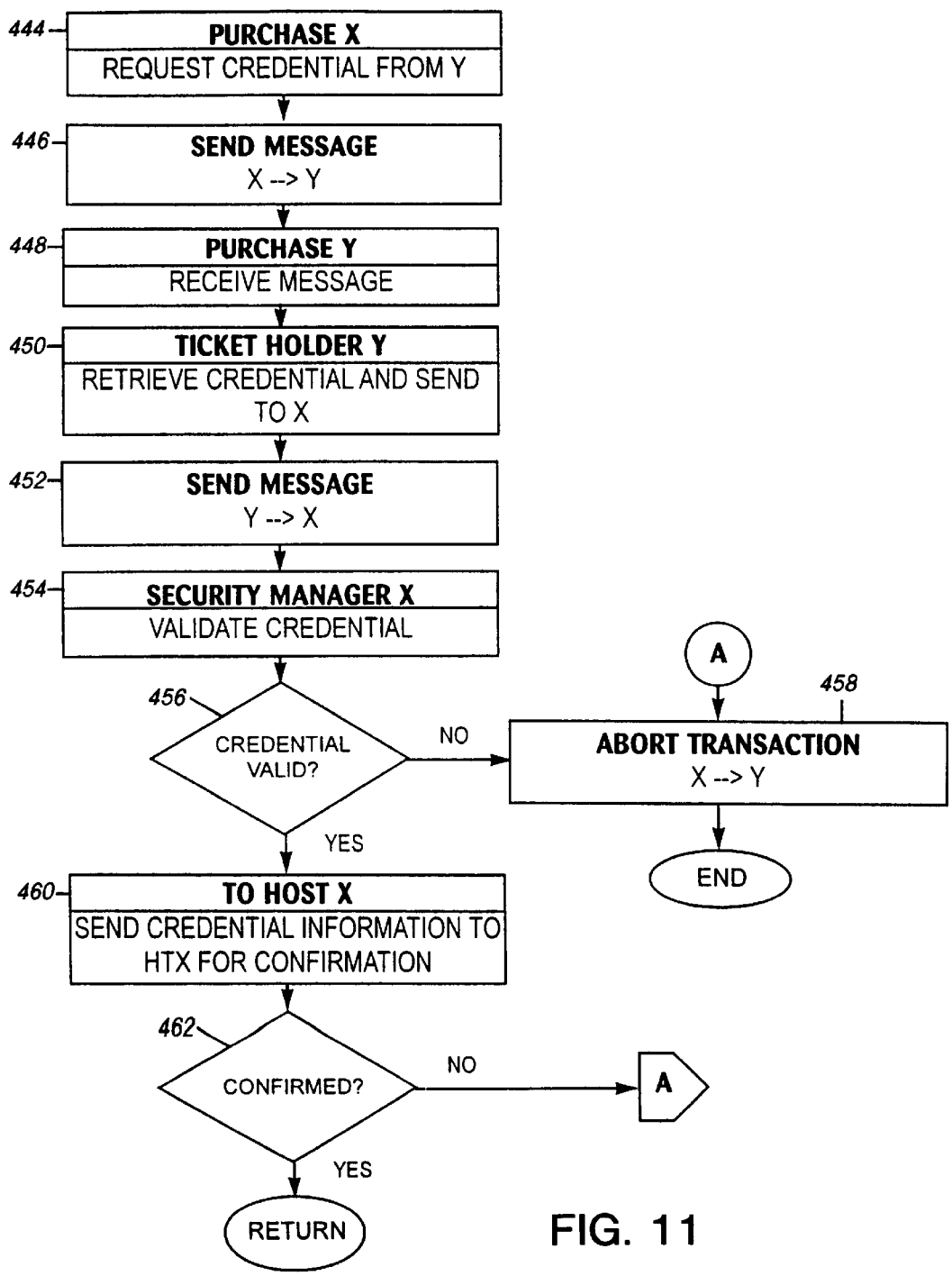
FIG. 11 illustrates a Check Credential protocol.

Referring again to FIG. 8, after establishing a session, trusted agent A requests and checks the customer credential of trusted agent B, also as described in U.S. Pat. No. 5,557,518. In particular, the Check Credential subroutine is called (step 708). Customer credentials held by CTDs 188 may include driver's licenses or credit cards for individuals or the customer credentials may be commercial credentials issued by various identification authorities. All MTDs 198 contain a credential identifying the owner/merchant. Such merchant credentials may, for example, be issued by a merchant identification authority controlled by the Trusted Agency. Referring to FIG. 11, Purchase A sends a message to Purchase B of trusted agent B requesting its customer credential (steps 444–448). Ticket Holder B retrieves its customer credential and sends the credential to A for validation (steps 450–456).

Credentials or any other type of ticket 8 are validated as follows:
1) Validate issuer certificate and check issuer signature.
2) Verify each transfer—match receiver and sender identifiers (i.e., $S_o$=Issuer, $R_o$=1st receiver, then $R_i=S_{i+1}$, $i \geq o$)
3) Validate each sender certificate and check each sender signature.
4) Verify that the last receiver identifier matches the identifier (TA(id)) of the certificate (cert(TA)) of the trusted agent in the current session.

Figure 12:
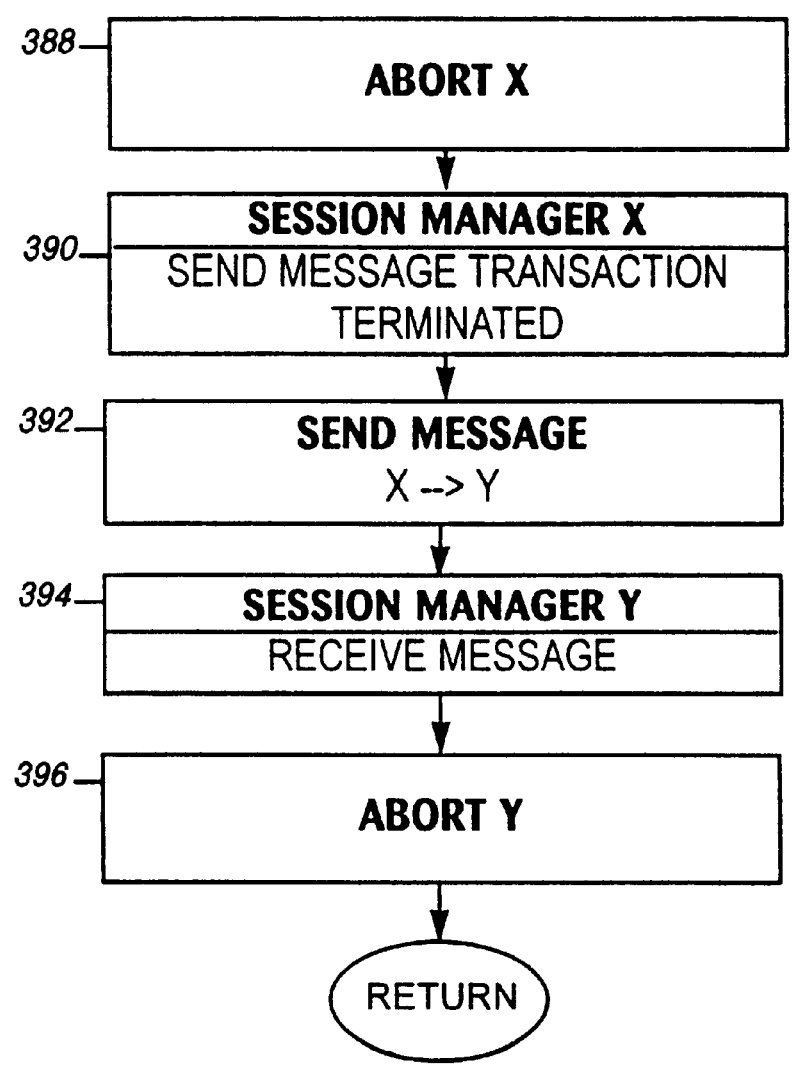
FIG. 12 illustrates an Abort Transaction protocol.
Figure 13A:
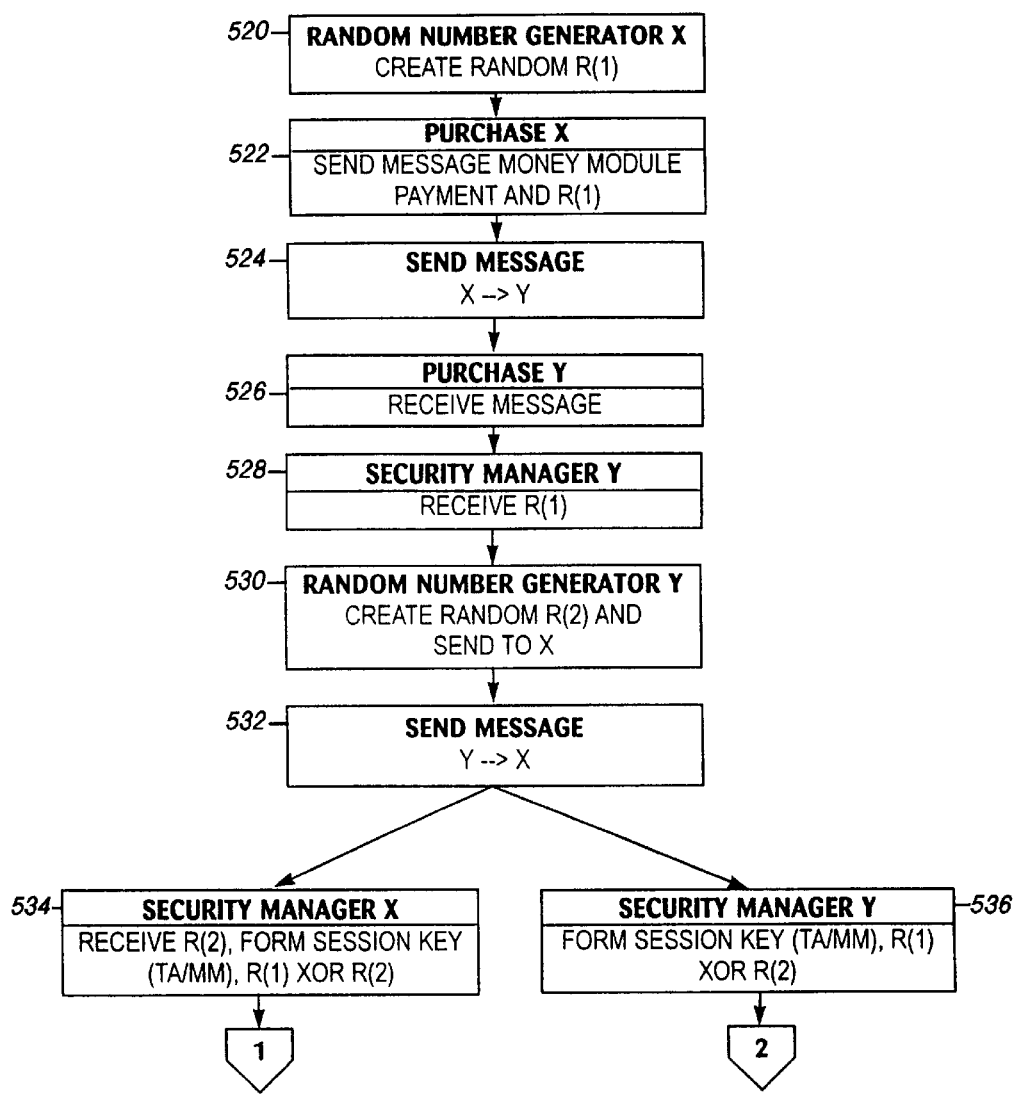
FIGS. 13A–13E illustrate a Money Module Payment protocol.
Figure 13B:
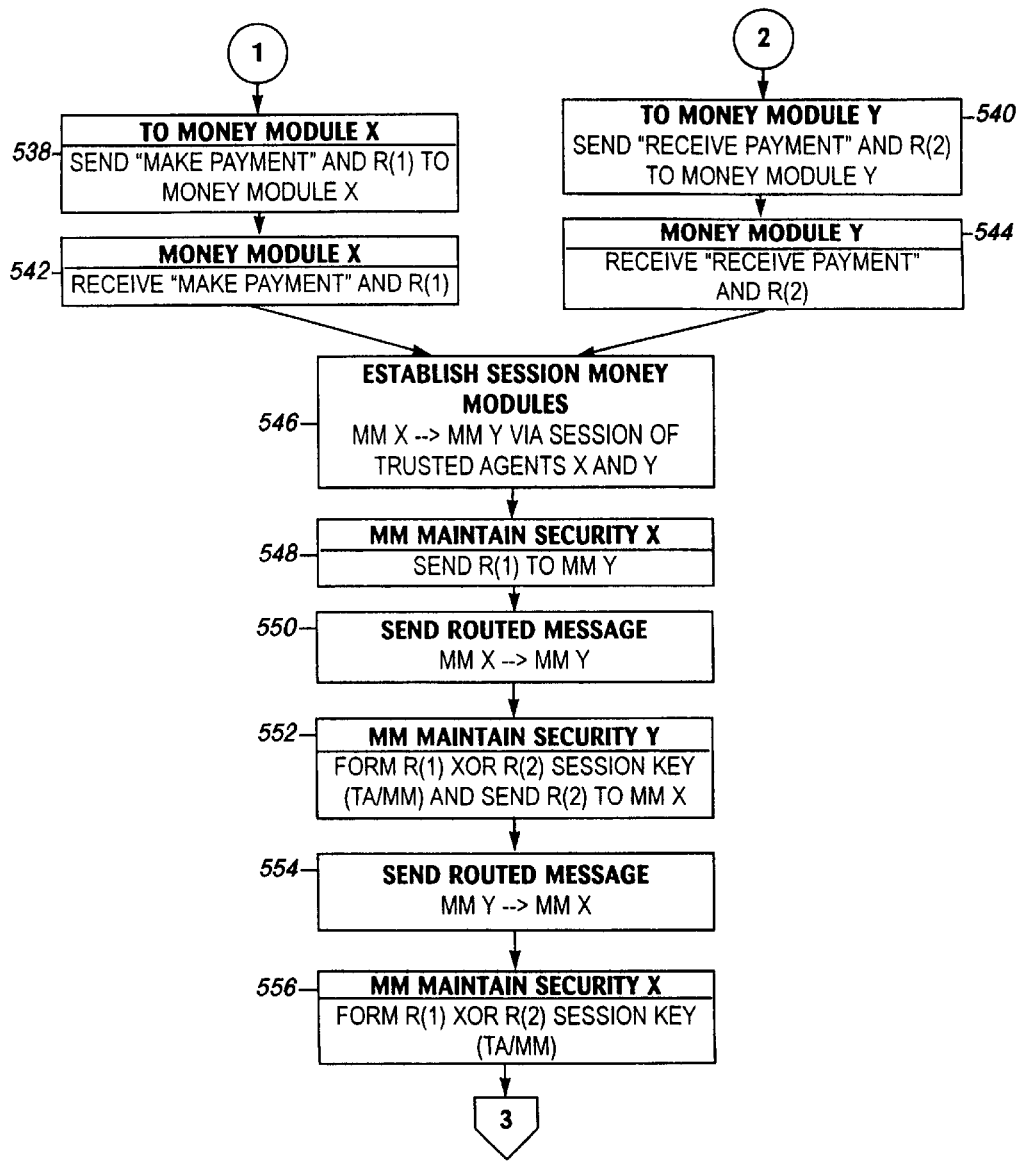
Figure 13C:
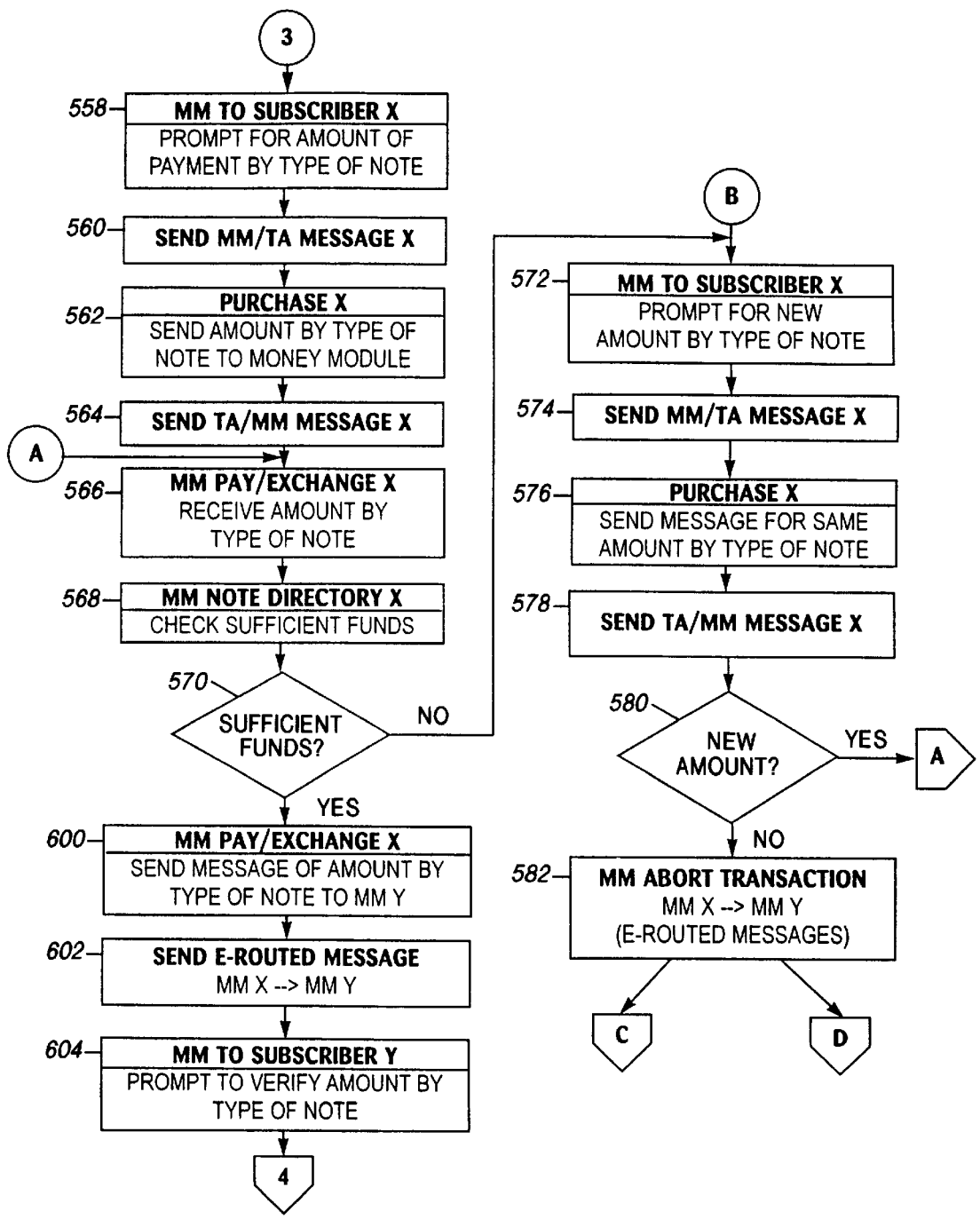
Figure 13D:
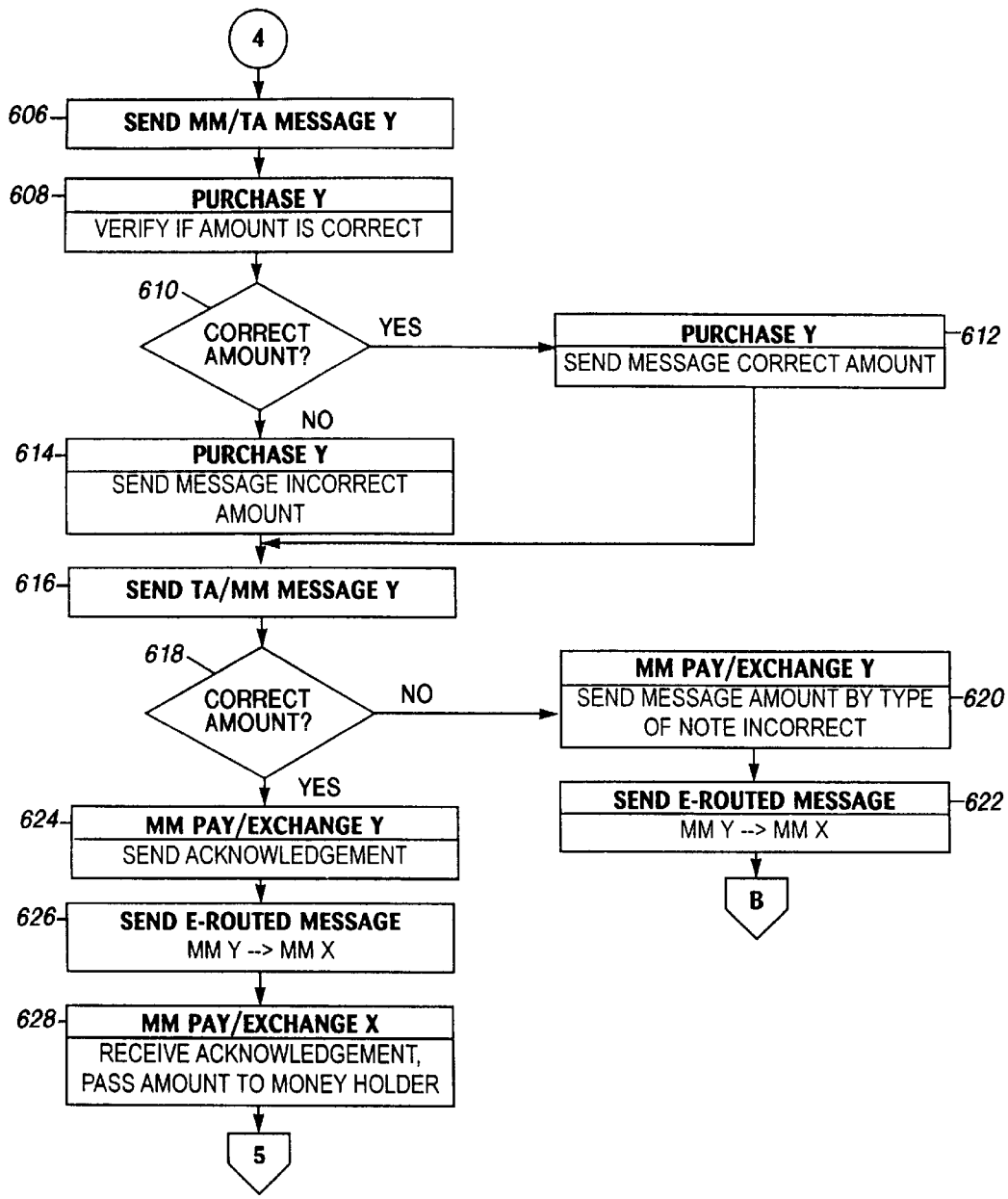
Figure 13E:
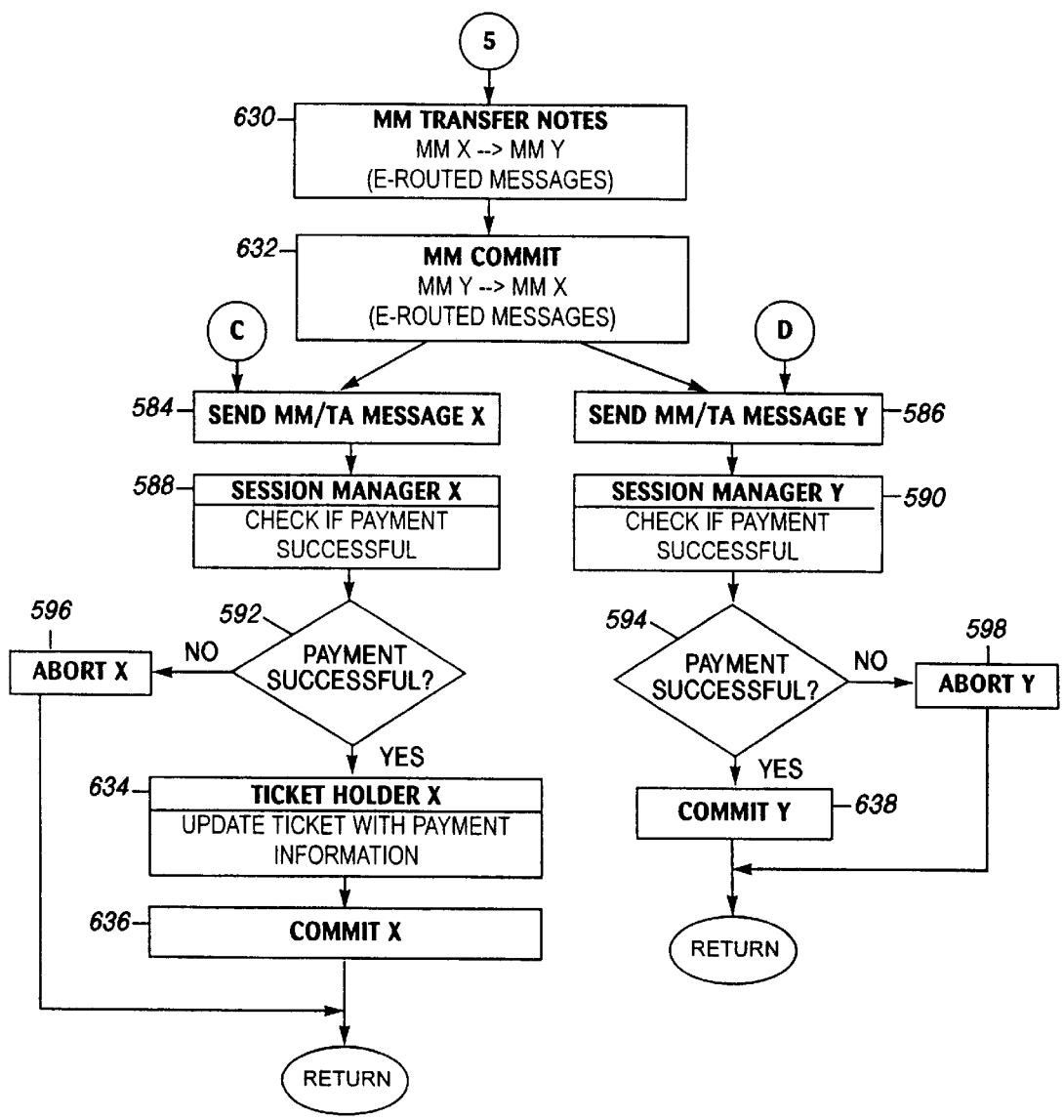

If the customer's credential is not valid, then the transaction is aborted by calling the Abort Transaction subroutine (step 458). Referring to FIG. 12, trusted agent A aborts (step 388) and its Session Manager sends a message to trusted agent B's Session Manager informing B that A has aborted (steps 390–394). Trusted agent B then aborts (step 396). Referring back to FIG. 11, if the customer's credential is valid, then To Host A sends the credential information to a host transaction application for confirmation (e.g., confirmation that the customer identities in the invoices match the customer identity in the customer credential) (steps 460–462).

Referring again to FIG. 8, To Host A requests any invoices and past due notices for presentment to the customer (step 710). HTA then sends the requested invoices and past due notices to trusted agent A which are received by To Host A (steps 712–714). Public Key A signs any invoices and past due notices and sends the signature (e.g., a group digital signature) to Ticket Holder A (step 716). Ticket Holder A then creates a presentment ticket which can be used to identify those invoices and/or past due notices being presented to the customer. Purchase A sends the invoices and/or past due notices and the presentment ticket to trusted agent B (steps 720–724). Public Key B then verifies the presentment ticket and the invoices/past due notices signature (steps 726–728). If the ticket or digital signature is invalid the transaction is aborted (step 730). If valid, then Purchase B sends the presentment ticket to Ticket Holder B and To Host B sends ticket information (e.g., the merchant identifier) and the invoices and past due notices to HTB (steps 732–734).

The customer trusted agent then initiates the Check Credential subroutine (step 736) whereby the merchant's credential is sent to the customer trusted agent. During the Check Credential subroutine the host transaction application confirms the merchant's credential by ensuring, for example, that the merchant identities in the invoices match the merchant identity in the merchant credential (steps 460–462).

The customer trusted agent's Tran Log then performs an interim log update to record the current state of the transaction. Such an update should record at least basic information from the presentment ticket (e.g., customer information and invoices/past due notices digital signature) (step 738). Session Manager B ensures that the interim update will not be rolled back (i.e., reversed) in the event of an abort (step 740). An acknowledgement is then sent to trusted agent A and received by the Session Manager (steps 742–744). The merchant's trusted agent then also performs an interim transaction log update of at least basic information from the presentment ticket (step 746). The Ticket Holder A sends the presentment ticket to the host (step 748) which thus provides additional storage of the presentment ticket external to the trusted agent. The Session Manager A ensures that the interim update in the merchant trusted agent will not be rolled back in the event of an abort (step 750). The Session Manager then sends a message to trusted agent B to continue the transaction (steps 750–754).

The host is queried to check for any existing remittance information corresponding to the invoices and/or past due notices. Accordingly, HTB sends the invoices and/or past due notices to the accounts payable system 189 to verify if any have already been paid (steps 756–760).

If some invoices and/or past due notices have been previously paid then HTB receives the corresponding remittance advices and commercial payment tickets (step 762). These remittance advices and commercial payment tickets are forwarded to trusted agent A via trusted agent B for validation (steps 764–768). Public Key A validates the signatures on the commercial payment tickets (step 772). If any of the commercial payment tickets are valid then the valid remittance information is sent to the Host A. The Host A forwards this information to the accounts receivable system 193 and notifies trusted agent A to proceed (steps 782–784). The accounts receivable system reconciles the forwarded remittance information with its database of remittance information.

If all of the commercial payment tickets are valid then Purchase A simply sends an acknowledgment to Purchase B (steps 788–792). However, if all or any commercial payment tickets are invalid then Purchase A sends the invalid remittance information to Purchase B, which transmits it to the Host B. The Host B forwards the invalid information to the accounts payable system 189. (Steps 774–781). The accounts payable system reconciles the invalid remittance information with its database of remittance information.

If the host B determines that none of the presented invoices or past due notices have been paid (step 760) or after step 781, HTB checks if any invoices or past due notices should be paid now (steps 796–798). Similarly, after step 792, the customer trusted agent prompts its host for instructions on payment of any presented invoice and/or past due notice (step 794). If none are to be paid, HTB notifies trusted agent B. Trusted agent B sends a message to trusted agent A that nothing will be paid (steps 800–806) and then commits (step 808). Upon receiving the no payment message, trusted agent A also commits (steps 810–812). When trusted agent B commits, the host B is instructed to send the unpaid invoices and past due notices to the accounts payable system 189 for setup (step 880). When trusted agent A commits, the host A is instructed to send the presentment ticket to the accounts receivable system 193 for presentment verification.

A determination is made as to which invoices and/or past due notices are to be paid. This decision may be made, for example, by a cash management function implemented in the host or externally (on one machine or multiple machines) alone or in consultation with another system such as an automated accounts payable system or even a human operator. If any or all invoices or past due notices are to be paid, then the host instructs trusted agent B to query its money module to check for sufficient funds (steps 798, 813–816). If the money module's funds are insufficient, then trusted agent B requests guidance from its host (step 818). HTB checks if other transaction devices 122 have the requested amount (steps 820–822). If another transaction device, C, has sufficient funds, then HTB sends a message to HTC to send electronic money (step 824). An electronic money payment (step 828) may be accomplished, for example, as described in U.S. Pat. No. 5,453,601.

In the event that no other transaction device C has a sufficient amount of electronic money, HTB checks if the amount can be withdrawn from a bank (steps 830–832). Electronic money can then be withdrawn from a bank as, for example, described in U.S. Pat. No. 5,453,601 (step 834). If a bank withdrawal is not possible, the HTB chooses a subset of invoices and/or past due notices which can be paid (step 836). Such a selection may be based on prioritization information received, for example, from a cash management system or a human operator. If no items can be paid then HTB notifies trusted agent B that there are no invoices or past due notices to be paid (steps 838 and 800). Trusted agent B then informs trusted agent A and both trusted agents commit as described previously (steps 802–812). Likewise, the hosts update their respective accounts payable and receivable systems (steps 880 and 886).

If sufficient funds are present in money module B then HTB creates a remittance advice and sends it to trusted agent B (step 840). Trusted agent B sends the remittance advice to trusted agent A (steps 842–844). Purchase A validates the remittance advice total amount to invoice and past due notice amounts (steps 846–848).

If the amounts are not validated then the transaction is aborted (step 850). If validated, the remittance advice is sent to the host A (step 852). Public Key A then signs the remittance advice and sends the digital signature to Ticket Holder A. Ticket Holder A creates a commercial payment ticket which is sent to trusted agent B for validation of the ticket and the remittance advice signature. (Steps 854–864). If not valid, the transaction is aborted (step 866) and the hosts update the respective accounts payable and receivable systems (steps 880 and 886).

If trusted agent B determines that the commercial payment ticket and advice signature are valid, then Purchase B sends the ticket to Ticket Holder B (step 868). Trusted agent B then initiates a money module payment from money module B to money module A as described below (step 874).

Trusted agent B performs a money module payment to trusted agent A as described in U.S. Pat. No. 5,557,518. In particular, a Money Module Payment sub-routine is called. Referring to FIG. 13, Random Number Generator B creates random number R(1) (step 520). Purchase B then sends a message to trusted agent A indicating that a "money module payment" will be made and also containing R(1) (step 522–524). Purchase A receives the message and sends R(1) to Security Manager A (steps 526–528). Random Number Generator A creates random number R(2) and sends it to trusted agent B (steps 530–532). Security Managers B and A both form session key (TA/MM) by exclusive ORing R(1) and R(2) (Steps 534–536).

Figure 14:
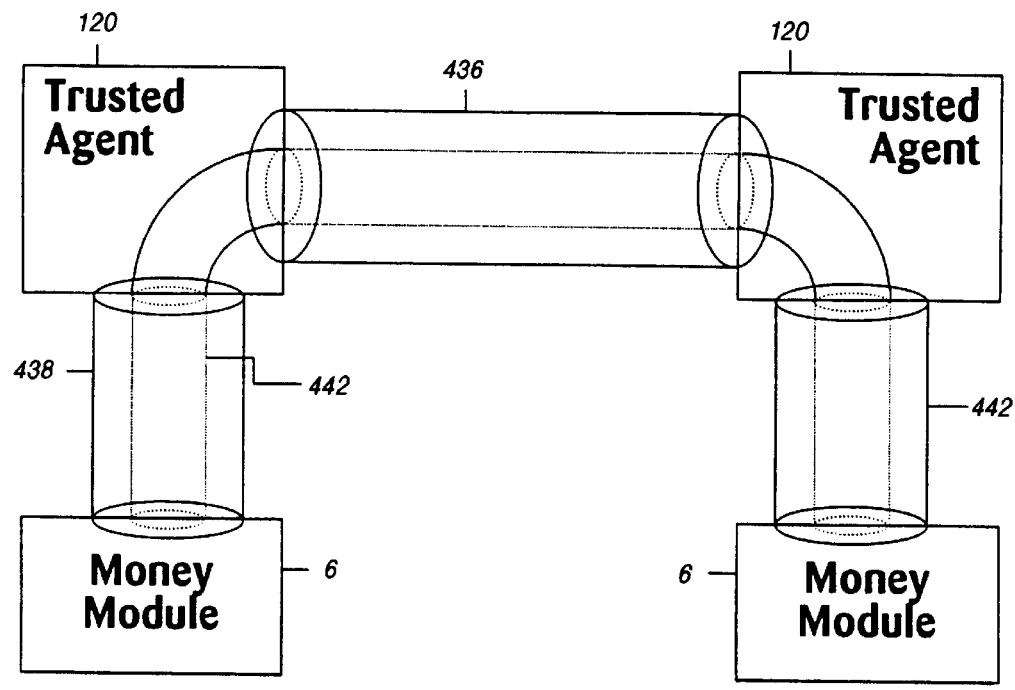
FIG. 14 shows the various message encryption layers established among trusted agents and money modules.
Figure 15A:
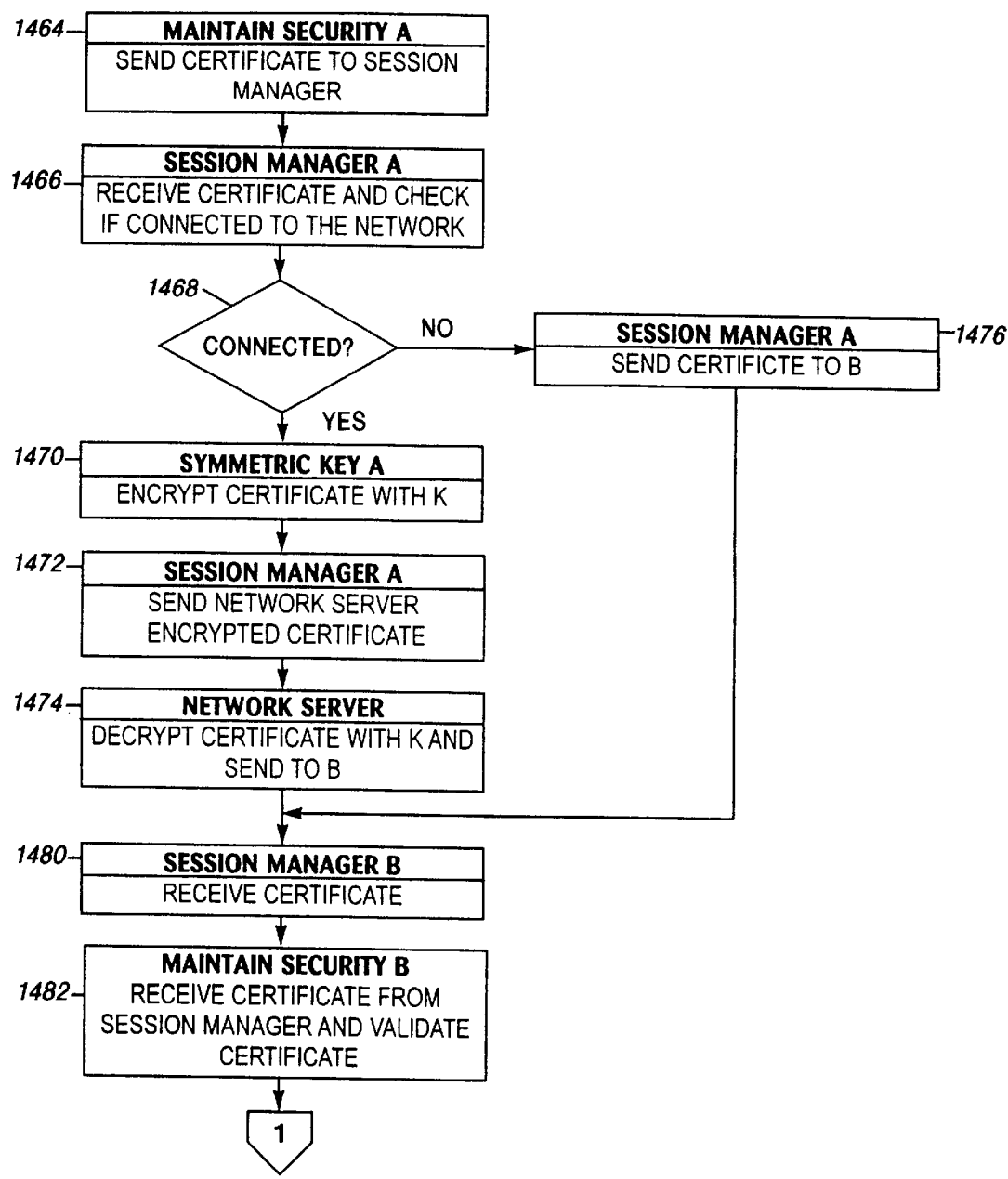
FIGS. 15A–15E illustrate an Establish Session protocol for money modules.
Figure 15B:
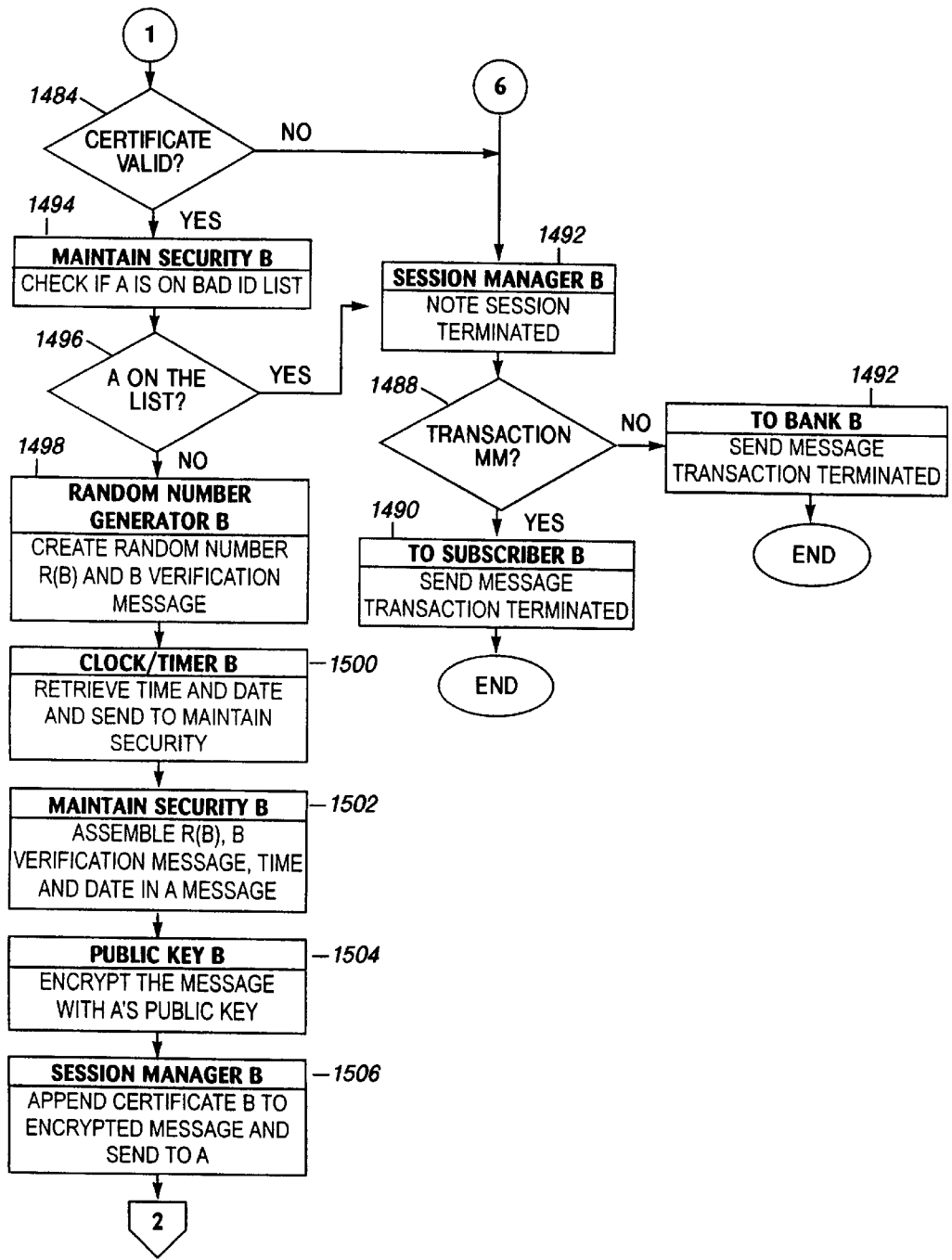
Figure 15C:
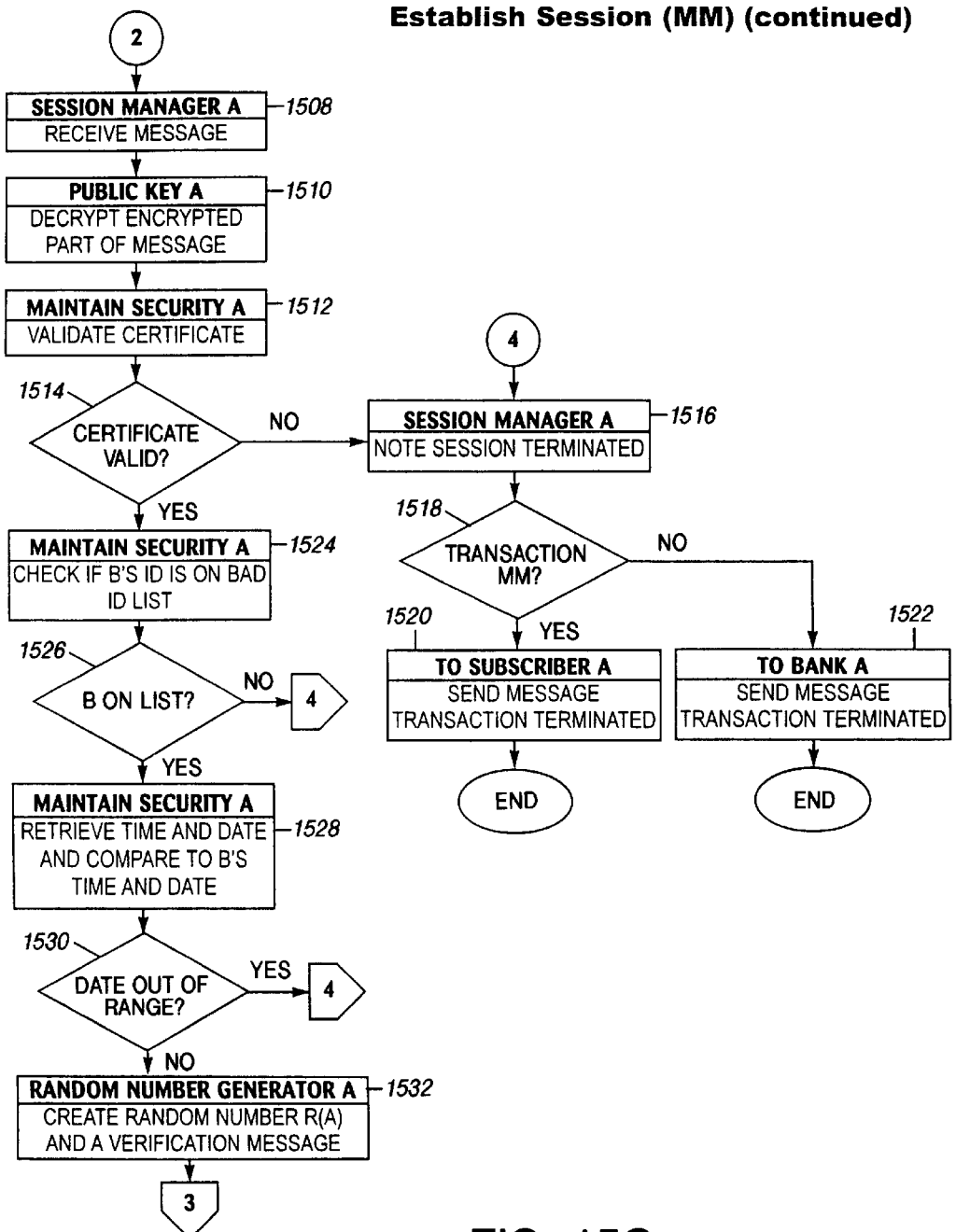
Figure 15D:
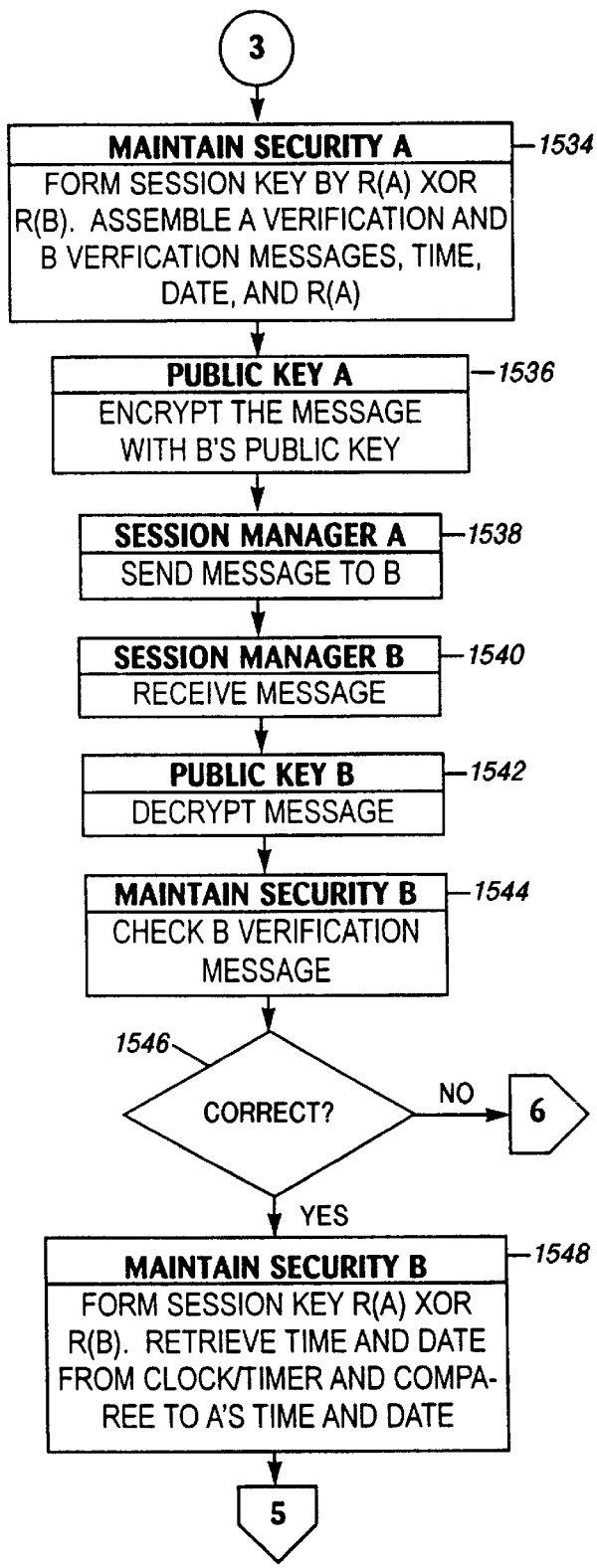
Figure 15E:
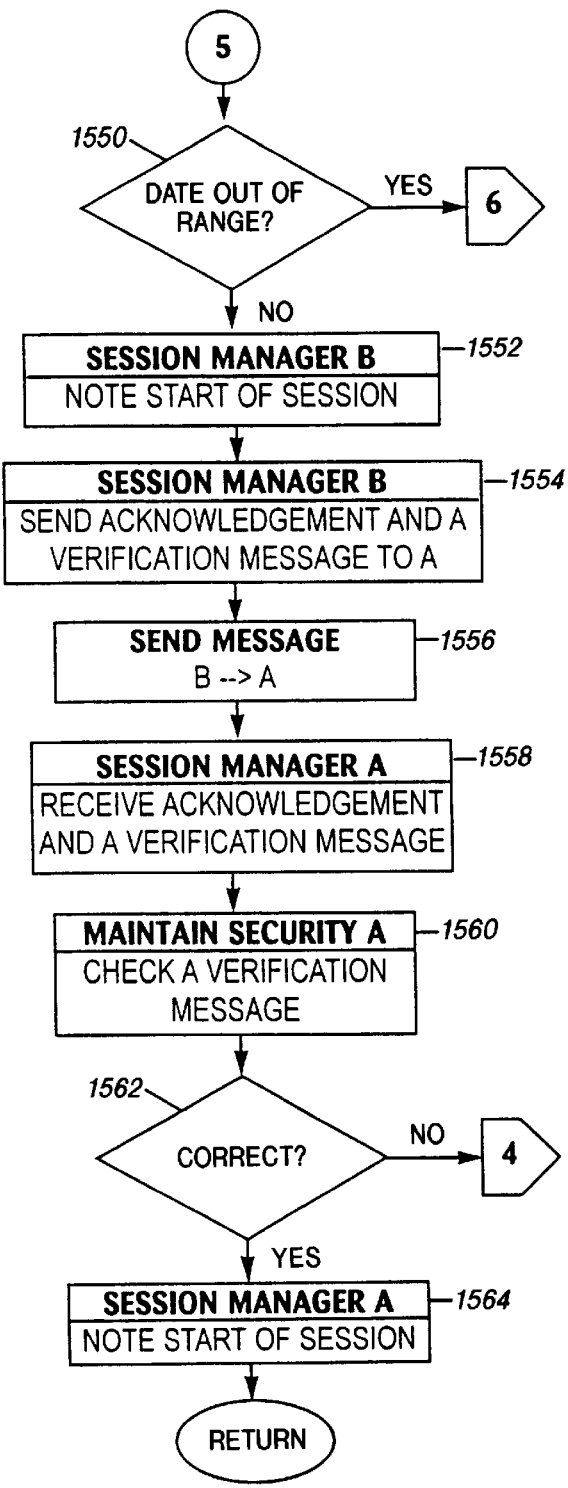

Referring to FIG. 14, there is shown four encryption channels established during a transaction. Encryption channel 436 between the two trusted agents 120 carries messages encrypted by session key (TA/TA). Channels 438 and 440 between a trusted agent 120 and its money module 6 share session key (TA/MM). Channel 442 between money modules 6 in different transaction devices 122 use session key (MM/MM).

Session key (TA/MM) is used for encrypting messages sent between a trusted agent 120 and its associated money module 6 via encryption channels 438 and 440. At the present point in the flow diagram, only the two trusted agents 120 have session keys (TA/MM). Both money modules 6 will later in the flow diagram form copies of session key (TA/MM) so as to enable encrypted communication between the trusted agents 120 and their money modules 6.

It may be noted, as previously mentioned, that instead of the trusted agent 120 and money module 6 being embodied as discrete tamper-proof components, they may be fabricated as one tamper-proof module. In this case, it would not be necessary to establish a secure session for communication between trusted agent 120 and money module 6 in the same transaction device 122. However, discrete money modules 6 and trusted agents 120 may be preferable in that such a configuration allows for greater application flexibility.

Referring back to FIG. 13, To Money Module B sends a "Make Payment" message and R(1) to its associated money module B. Also, To Money Module A sends a "Receive Payment" message and R(2) to its associated money module A (steps 538–544).

At this stage, money module B and money module A establish a session between them so that each money module 6 winds up holding new session key (MM/MM) (step 546). In establishing this money module to money module session, the money modules exchange messages via the pre-existing trusted agent's session. Referring to FIG. 14, the session key for encryption channel 442 is formed by exchanging messages encrypted by channel 436. After the money module session is established, messages sent between money modules will be encrypted twice, by both session key (MM/MM) and session key (TA/TA), along the portion of the communication path between trusted agents 120.

In the preferred embodiment, the money module session is established in a manner similar to the establishment of a trusted agent session. The money modules 6 would therefore hold their own certificates containing their public keys. The swapping of certificates and random numbers (for XORing) enables the secure creation of session keys (MM/MM). The Establish Session protocol used by money modules is described in U.S. application Ser. No. 08/427,287 and is shown in FIG. 15. Maintain Security B sends the module certificate to the session manager, and Session Manager B receives the certificate and checks if money module B is connected to the network (steps 1464–1466). If money module B is not connected to the network, then Session Manager B sends the certificate received from Maintain Security B to destination A (step 1476).

Alternatively, if money module B is connected to the network, then Symmetric Key B encrypts the certificate with K and Session Manager B sends the encrypted certificate to the network server (step 1468–1472). The Network Server decrypts the certificate with K and sends the certificate to destination A.

Regardless of whether the certificate was sent by the Network Server or by Session Manager B, Session Manager A receives the certificate and Maintain Security A (if A is a security server, then this function is performed by the Session Manager) validates the certificate (steps 1480–1482). If the certificate is not valid, then Session Manager A notes the session is terminated and informs either the subscriber or the bank (steps 1486–1492) (if A is a security server, then A merely notes the transaction is terminated).

If the certificate is valid, then Maintain Security A checks if B is on the bad id list (steps 1494–1496). If B is on the list, then the session is terminated. If B is not on the list, then Random Number Generator A creates random number R(A) and an A verification message (step 1498). Clock/Timer A retrieves the time and date (step 1500). Maintain Security A assembles R(A), A verification message and time and date in a message (step 1502). Public Key A encrypts the message with B's public key and Session Manager A appends A's certificate to the encrypted message and sends the message to B (steps 1504–1506).

Session Manager B receives the message, Public Key B decrypts the encrypted part of the message, and Maintain Security B validates A's certificate (steps 1508–1514). If the certificate is not valid, then Session Manager B notes the termination of the session and informs either the subscriber or the bank (steps 1516–1522). If the certificate is valid, then Maintain Security B checks if A is on the bad id list (steps 1524–1526). If A is on the list, then the session is terminated. If A is not on the list, then Maintain Security B retrieves the date and time and compares it to A's date and time (steps 1528–1530). If the date and time are out of range, then the session is terminated.

If the date and time are in range, then Random Number Generator B creates random number R(B) and a B verification message (step 1532). Maintain Security B then forms a session key by the operation R(B) XOR R(A) (step 1534). The B verification message, the A verification message, the time, date and R(B) are assembled into a message and encrypted with A's public key (step 1536). The message is sent to A by Session Manager B (step 1538). Session Manager A receives the message, Public Key A decrypts the message and Maintain Security A checks the A verification message (steps 1540–1546). If the A verification message is incorrect, the session is terminated. If the A verification message is correct, then Maintain Security A forms the session key by R(B) XOR R(A) (step 1548). The time and date are retrieved and compared to B's time and date to check if they are within a predefined range of each other (step 1550). If the time and date are out of range, then the session is terminated. If the time and date are in range, then Session manager A notes the start of the session (step 1552).

Session Manager A then sends an acknowledgement and the B verification message to B (steps 1554–1556). Session Manager B receives the message and Maintain Security B checks the B verification message (steps 1558–1562). If the verification message is not correct, the session is terminated. If the verification message is correct, then Session Manager B notes the start of the session (step 1564).

The overall system security pertaining to the money modules may be integrated with that for the trusted agents 120, but is preferably separate to provide for enhanced system security and system flexibility.

Referring back to FIG. 13, money module B sends R(1) to money module A. This function may be initiated by a MM Maintain Security B application residing in money module B (step 548). This application and other money module applications are prefaced by the designations "MM" and are described in commonly assigned U.S. Pat. No. 5,453,601 together with any modifications and/or additions disclosed in U.S. Pat. No. 5,557,518

Figure 16:
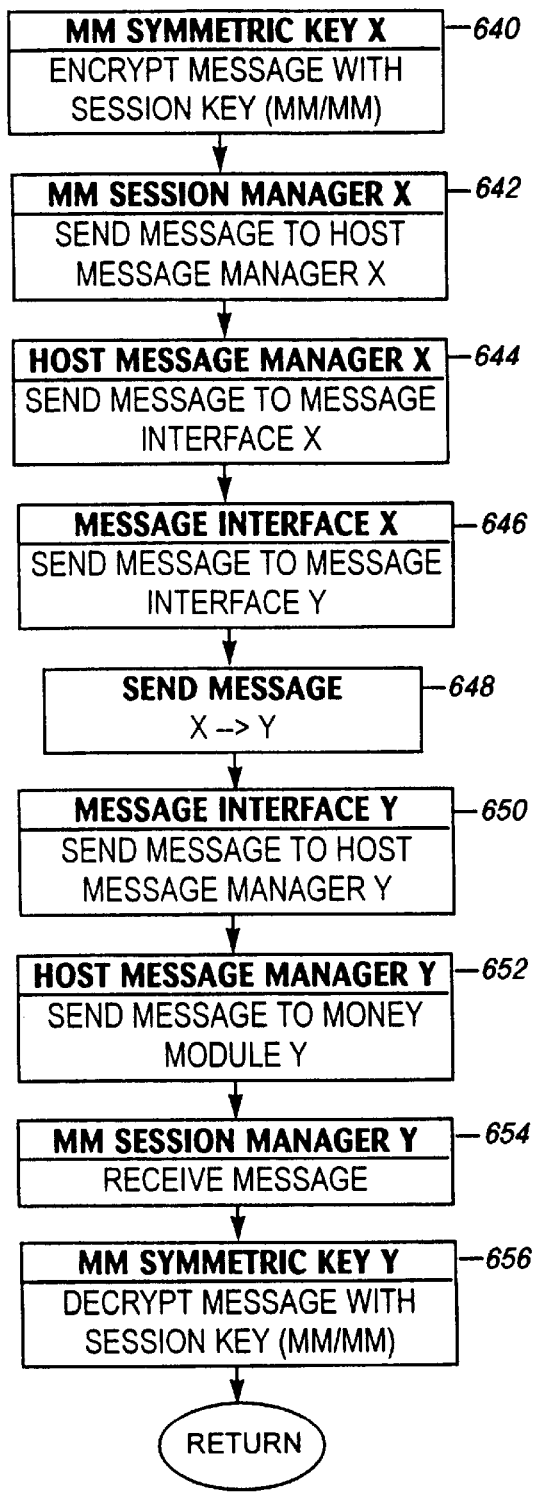
FIG. 16 illustrates a Send Routed Message protocol.

Random number R(1) is sent from money module B to money module A by the subroutine Send Routed Message (step 550). Referring to FIG. 16, MM Symmetric Key B encrypts the message (including R(1)) with session key (MM/MM) (step 640). MM Session Manager B sends the message to Host Message Manager B which, in turn, sends the message to Message Interface B of trusted agent B (steps 642–646). Trusted agent B then sends the message to Message Interface A of trusted agent A using the Send Message subroutine (step 648) which encrypts and decrypts the message with session key (TA/TA) in between the trusted agents. Message Interface A then sends the message to MM Session Manager A in money module A via Host Message Manager A (steps 650–654). Finally, MM Symmetric Key A decrypts the message with session key (MM/MM) (step 656).

Referring again to FIG. 13, MM Maintain Security A (in money module A) forms session key (TA/MM) by exclusive ORing R(1) and R(2). Money module A then sends R(2) to money module B which also forms session key (TA/MM) by exclusive ORing R(1) and R(2) (Steps 552–556). Referring to FIG. 14, at this stage, three session keys exist: (MM/MM), (MM/TA), and (TA/TA). Thus, the four encryption channels shown are in place.

Referring to FIG. 13, MM To Subscriber B prompts trusted agent B for the amount of payment by type of note (e.g., dollars, yen, pounds, etc.) (step 558). A money module as described in U.S. Pat. No. 5,453,601, would generally use the To Subscriber application for communication with the owner/holder of the money module. However, as used in the present instance, the To Subscriber application communicates with the trusted agent 120 for getting various instructions. Here, the trusted agent 120 delivers amount of payment and type of note information (trusted agent A has previously communicated with the owner/holder of the transaction device 122 to determine the amount).

Figure 17:
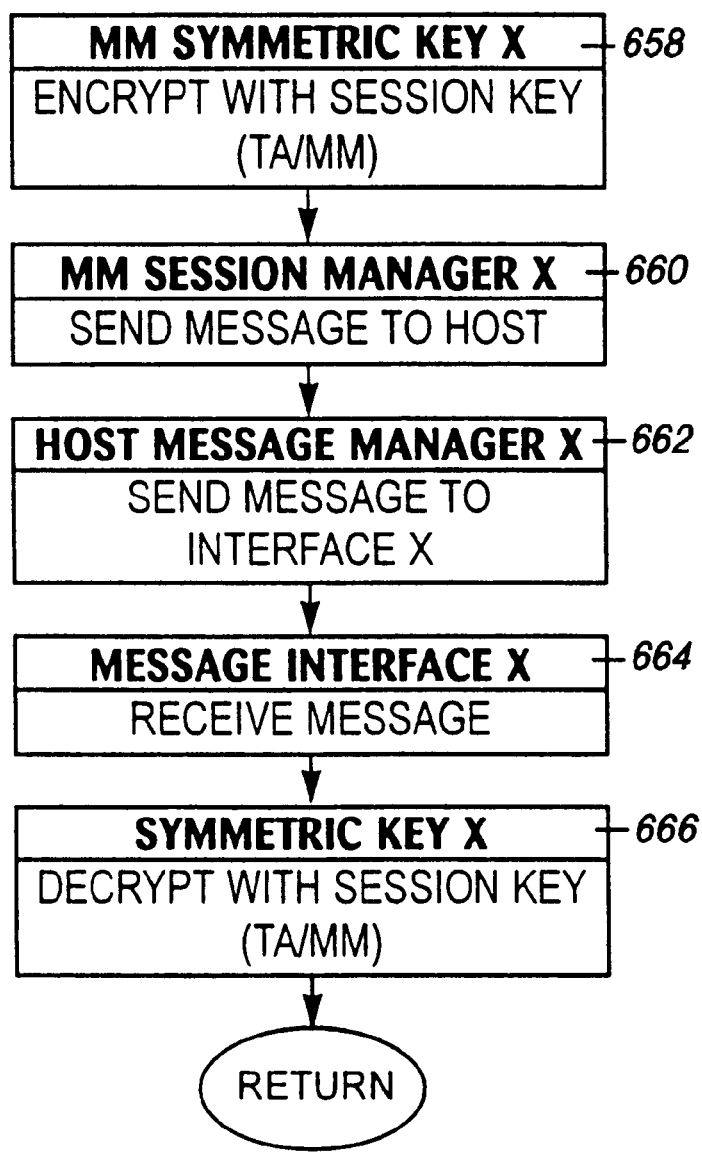
FIG. 17 illustrates a Send MM/TA Message protocol.
Figure 18:
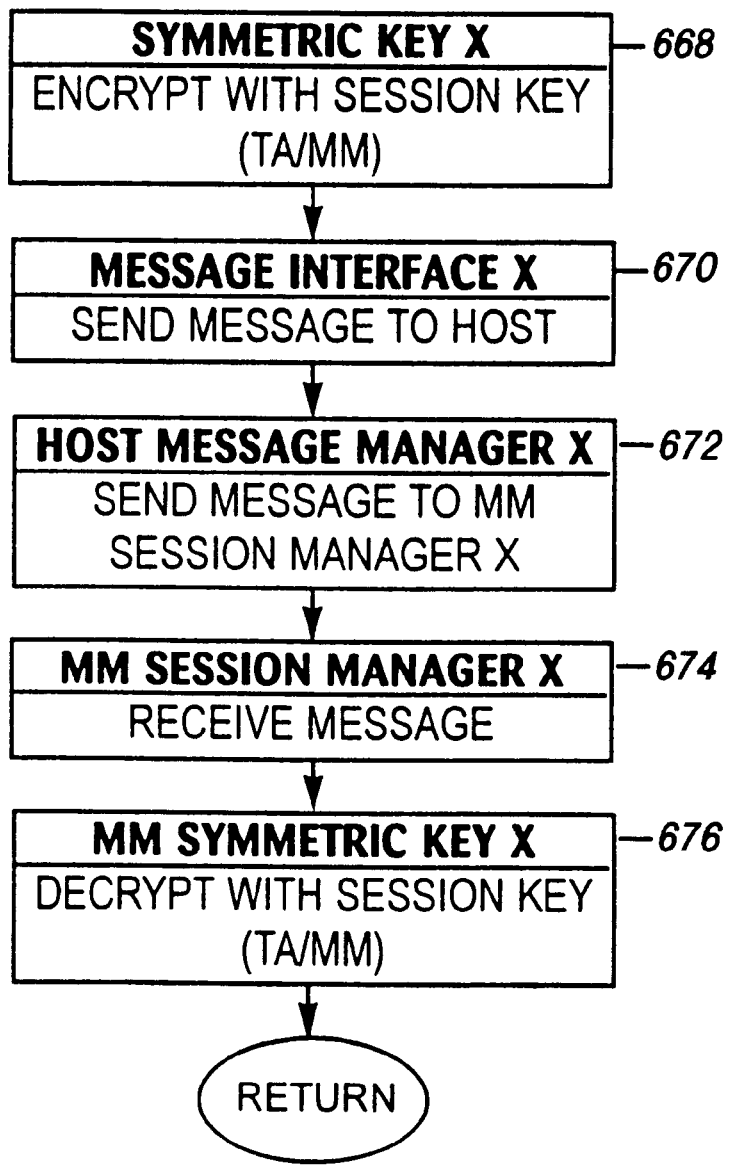
FIG. 18 illustrates a Send TA/MM Message protocol.

The prompt from the money module 6 to the trusted agent 120 is sent via the Send MM/TA Message subroutine (step 560). Referring to FIG. 17, MM Symmetric Key B encrypts the message with session key (TA/MM) (step 658). MM Session Manager B sends the message to trusted agent B's Message Interface via Host Message Manager B (steps 660–664). Symmetric Key B decrypts the message with session key (TA/MM) (step 666). Referring back to FIG. 13, Purchase B of trusted agent B sends the amount by type of note to MM Pay/Exchange B of money module B (steps 562–566). This message is sent via the Send TA/MM Message subroutine (step 564). Referring to FIG. 18, Symmetric Key B encrypts the message with session key (TA/MM) (step 668). Message Interface B sends the message to money module B's MM Session Manager via Host Message Manager B (steps 670–674). Finally, MM Symmetric Key B decrypts the message with session key (TA/MM) (step 676).

Referring to FIG. 13, MM Note Directory B checks if the money module 6 has sufficient funds to cover the payment (steps 568–570). If insufficient, then money modules B and A abort the transaction (steps 572–582). An insufficient funds situation should not occur because money module B's funds where already checked in step 816. Nevertheless, the MM Abort Transaction protocol will be described for completeness.

Figure 19A:
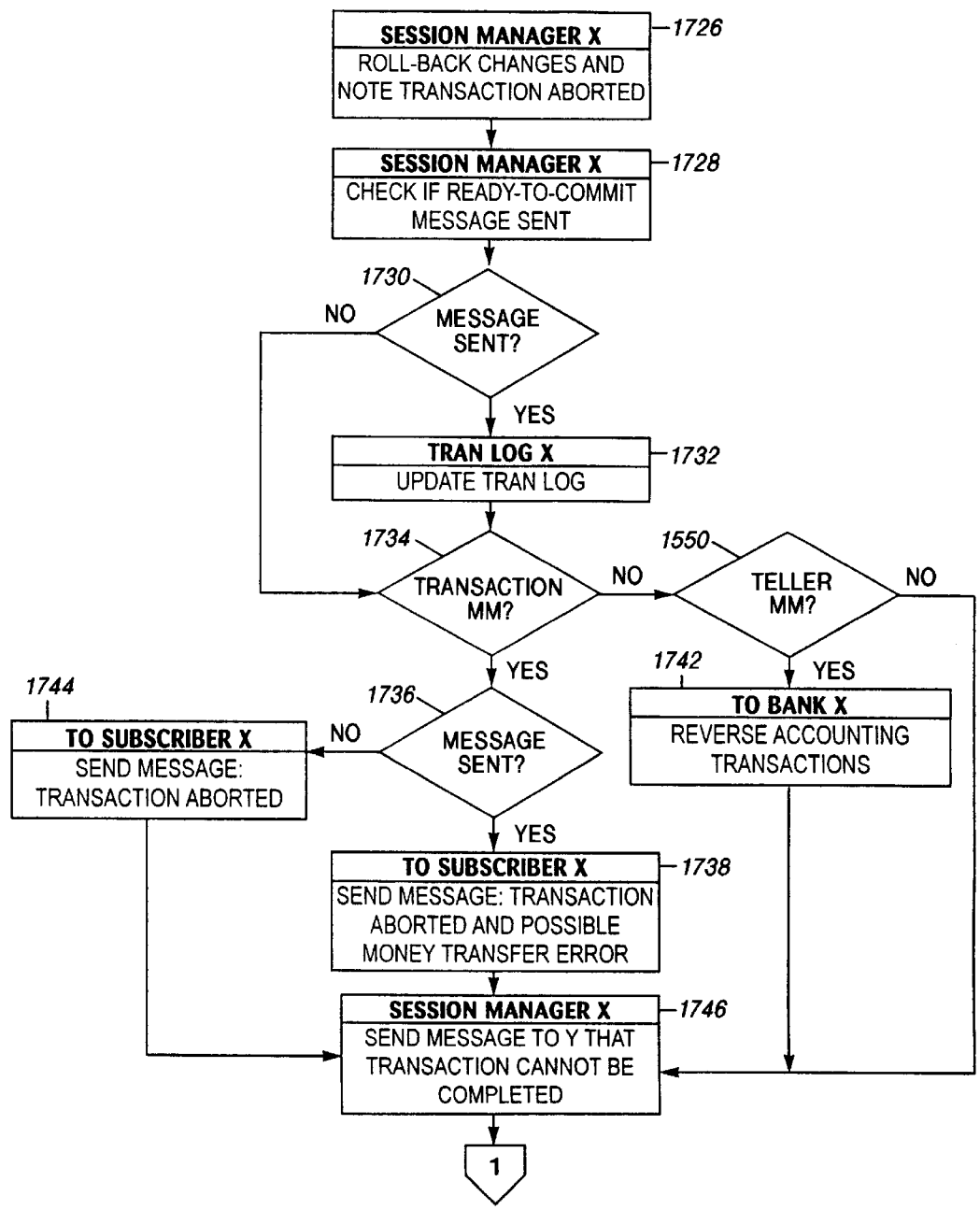
FIGS. 19A–19B illustrate an Abort Transaction protocol for money modules.
Figure 19B:
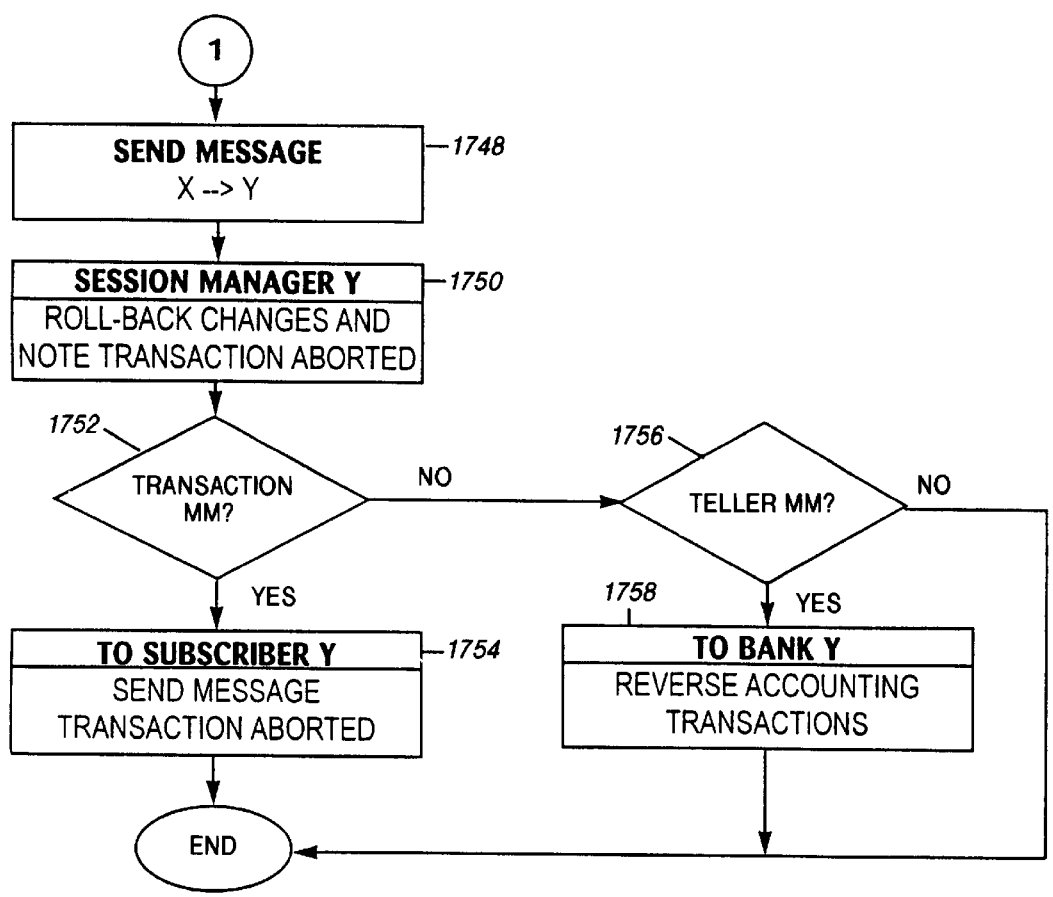

The MM Abort transaction protocol (step 582) may be that of the preferred electronic monetary system as described in U.S. application Ser. No. 08/427,287 and shown in FIG. 19. Session Manager X rolls-back changes and notes that the transaction is aborted (step 1726). Session Manager X then checks if the "Ready-to-Commit" message has been sent (steps 1728–1730). If so, then X updates its transaction log (step 1732) by recording that X committed after sending a Ready-to-Commit message and recording the note identifiers and amounts of each note received during the Transfer Notes protocol. Thus, the abort protocol logs information when the Abort subroutine is called during a failed Commit subroutine.

If X is a transaction money module 1186, and the Ready-to-Commit message was sent, then To Subscriber X informs its subscriber that the transaction was aborted and that there may have been a money transfer error (steps 1734–1738).

If X is a teller money module 1188, then To Bank X informs the bank that it should reverse its accounting transactions (by appropriate debits and credits) (steps 1740–1742). If X is a transaction money module 1186 and no Ready-to-Commit message has been sent, then To Subscriber X informs the subscriber that the transaction was aborted (step 1744).

In any event, Session Manager X then sends Y a message that the transaction cannot be completed (steps 1746–1748). Session Manager Y rolls-back its changes and notes the transaction as aborted (step 1750). Y then informs its subscriber that the transaction is aborted (steps 1752–1754) or informs the bank to reverse its accounting transaction (steps 1756–1758).

As described, if a transaction is interrupted during a commit protocol, it is possible that notes will be lost. If this occurs, the transferee will have aborted and the transferor will have committed to the transfer of notes. In this case, the transferee money module records information about the notes it should have received and notifies the subscriber that there is a potential problem (i.e, it did not receive the notes sent by B). It may be noted that in this circumstance, as far as the transferor money module is concerned, it properly transferred the notes.

The transferee money module subscriber can then make a claim for the money to the Certification Agency. The claim information would include the log record of the failed transaction. The Certification Agency could then check with issuing banks to see if the notes have been reconciled. After some period of time, if the notes have not been reconciled, the subscriber could reclaim his money.

Figure 20:
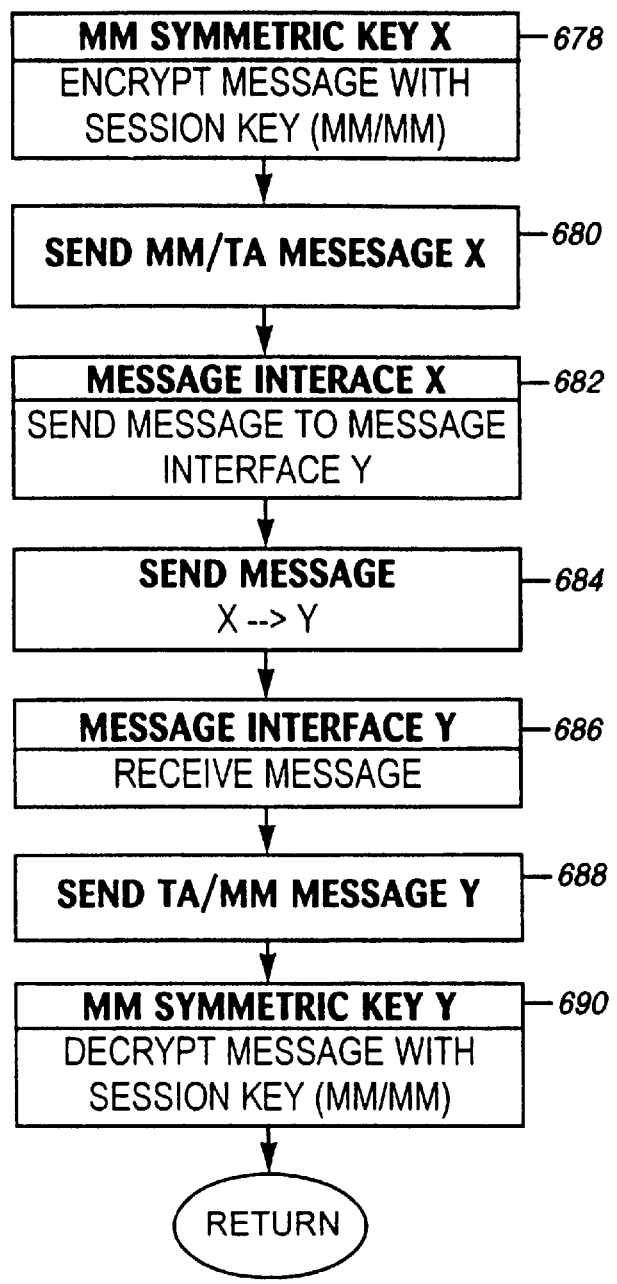
FIG. 20 illustrates a Send E-Routed Message protocol.

Referring again to FIG. 13, the messages between money module B and money module A are sent via a Send E-Routed Message subroutine which utilizes all three session keys (MM/MM), (TA/MM), and (TA/TA). Referring to FIG. 20, MM Symmetric Key B encrypts a message with session key (MM/MM) (step 678). The message is then double encrypted by session key (MM/TA) before it is sent to trusted agent B. Once received by trusted agent B, the message is decrypted by session key (MM/TA). (Step 680). Message Interface B then sends the message to Message Interface A (steps 682–684). In between trusted agents 120, the message is double encrypted by session key (TA/TA). In like manner, Message Interface A sends the message to MM Symmetric Key A for final decrypting (steps 686–690). FIG. 14 illustrates the various encryption layers.

Referring again to FIG. 13, during the abort routines of money modules B and A (step 582), they generate messages sent to their trusted agents B and A, respectively (steps 584–586) informing them that they have aborted the transaction and hence that payment was unsuccessful. Session Managers B and A note that the payment was unsuccessful and consequently trusted agents B and A abort (steps 588–598).

In the case where money module B has sufficient funds, MM Pay/Exchange B sends a message to the money module A containing the amount of money to be transferred and the type of notes (step 600). This message is sent by the Send E-Routed Message subroutine (step 602).

Money module A receives the message containing the payment amount according to money module B. MM To Subscriber A then sends a prompt to trusted agent A to verify this payment amount (steps 604–606). Accordingly, Purchase A in trusted agent A verifies if the amount is correct (steps 608–610). If correct, then trusted agent A sends a "Correct Amount" message to money module A. If incorrect, then an "Incorrect Amount" message is sent. (Steps 612–616). In the event of an "Incorrect Amount" message, money module A informs money module B which, in turn, requests its trusted agent to resend a new amount or else abort (steps 618–622, 572–582).

If, on the other hand, money module A receives a "Correct Amount" message from its trusted agent, then money module A sends an Acknowledgement message back to money module B (steps 624–626). When MM Pay/Exchange B receives the Acknowledgement message, it then passes the amount to Money Holder B (the application which contains and manages the electronic representations of money) (step 628). Note that the payor initiated protocol just described may instead be implemented as a payee initiated payment.

Figure 21A:
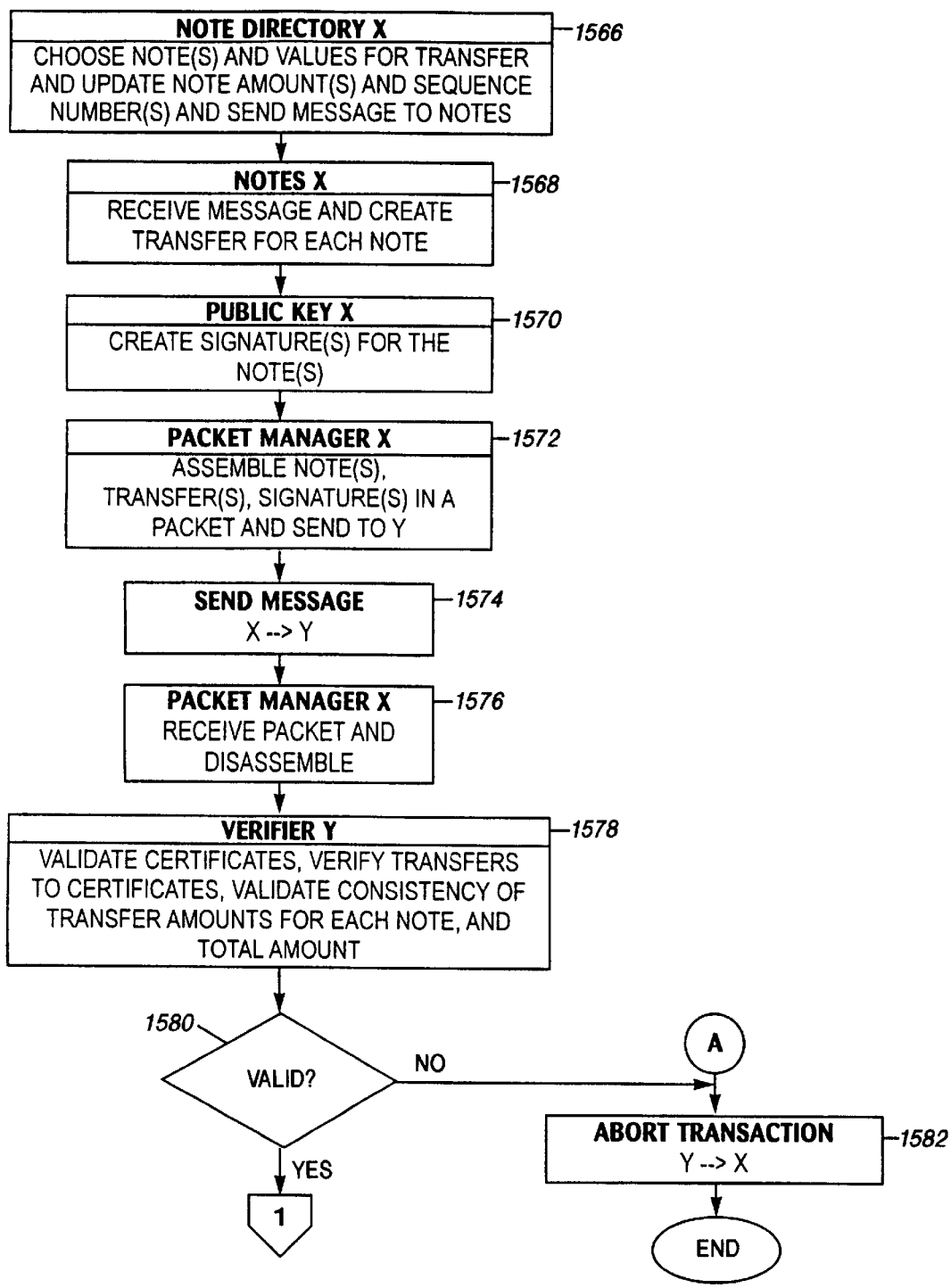
FIGS. 21A–21B illustrate a Transfer Notes protocol.
Figure 21B:
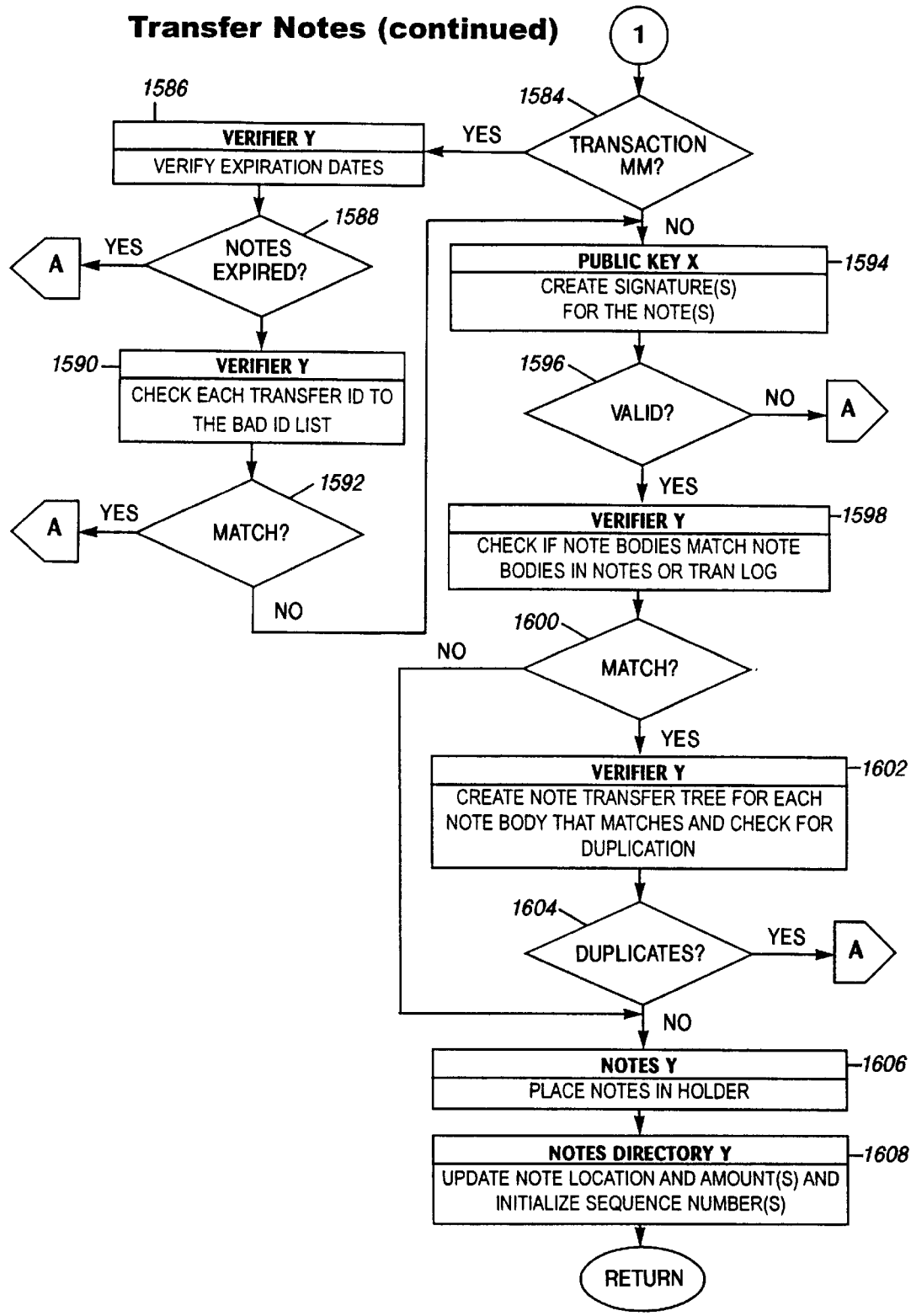

Referring again to FIG. 13, money module B then transfers electronic notes in the amount specified to the money module A via the E-Routed message path (step 630). FIG. 21 shows a Transfer Notes protocol as described in U.S. application Ser. No. 08/427,287. Note Directory X chooses the note(s) and values for transfer, updates the note amount(s) and sequence number(s), and then sends the message to Notes (step 1566). Possible objectives in choosing the notes for transfer may, for example, be: (1) minimize the number of digital signatures (which requires processing time); (2) minimize the size of the packet; (3) maximize the usefulness of the electronic notes left to the transferring subscriber (i.e., pass the notes with the shortest time left until expiration). Such objectives may be achieved by the following note transfer algorithm: (1) determine all possible alternatives which contain the least number of notes; (2) determine which of these alternatives have the least number of transfers; (3) if more than one choice is left from step 2, choose the one which has the least number of monetary unit days. Monetary-unit days=residual value of note to be transferred times the number of days left until the note expires, summed for all the notes in the packet.

Notes X, upon receiving the message from Note Directory X, creates a transfer to be appended to each note being transferred (step 1568). Public Key X creates signatures for the note(s) (step 1570). Alternatively, as previously mentioned, instead of producing separate digital signatures for each note, a group signature technique could be used wherein each note is processed by a one-way hash function and then a group signature based on these hashed notes is created. Packet Manager X then assembles the note(s) with their new transfer(s) and signature(s) in a packet and sends the packet to Y (steps 1572–1574). Packet Manager Y receives the packet and disassembles it (step 1576).

Verify Y validates all certificates in the note(s) (e.g., money generator certificate and all transfer certificates). Then Verify Y verifies that the identification numbers in the transfer group match up with the module identification numbers of the certificates in the signature and certificate group throughout the history of the electronic note. Also, the consistency of the transfer amounts for each note is validated by ensuring that throughout the electronic note history the amount transferred in each successive transfer is less than that of the immediately precedent transfer. In addition, the total amount transferred is checked to ensure it is the amount expected. (Steps 1578–1580). If not valid, then the transaction is aborted (step 1582).

If valid and Y is a transaction money module, then Verifier Y verifies the expiration dates of the note(s) (steps 1584–1588). If any of the note(s) have expired, then the transaction is aborted. If none have expired, then Verifier Y checks each id from the note transfers against the bad id list (steps 1590–1592). If any of the transfer id's are on the bad id list, then the transaction is aborted.

If the transfer id's are not on the bad id list (or Y is not a transaction money module), then Public Key Y verifies the validity of the note(s) signatures (steps 1594–1596). If any signature is not valid, then the transaction is aborted. If the signatures are valid, then Verifier Y checks if the note(s) bodies match note bodies that are stored by the Notes application or located in the Tran Log (steps 1598–1600). For each note body that matches, a note transfer tree is created in order to determine whether there has been any note duplication (steps 1602–1604). If any of the notes have been duplicated, then the transaction is aborted. This check for duplication (i.e., steps 1598–1604) is particularly directed to, and well suited for, thwarting individuals who attempt to create money by transferring notes by "self-dealing" using a compromised transaction money module.

If there are no duplicates, or if no matches of note bodies were identified, then Notes Y places the note(s) in the money holder (step 1606). Finally, Note Directory Y updates the note(s) location(s) and amount(s), and also initializes sequence number(s) (step 1608).

It may be understood that the Transfer Notes process includes steps for updating and initializing a sequence number to facilitate note reconciliation, checking if the transferee of any note is on the bad id list, and checking for note duplication. These additional features and steps make it difficult for adversaries to introduce and circulate duplicated notes, and enhance the ability to detect duplicated notes in circulation.

Figure 22:
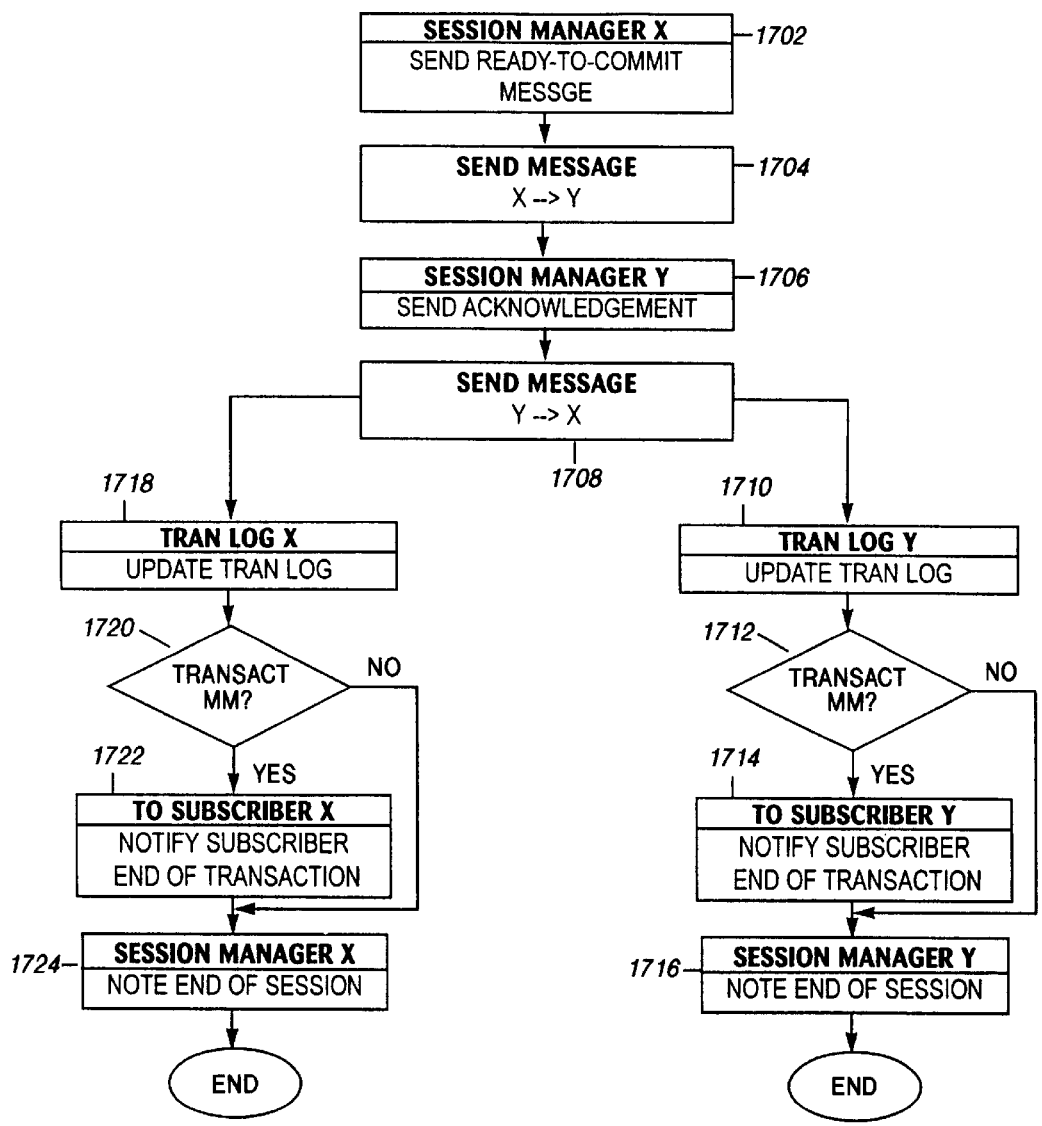
FIG. 22 illustrates a Commit protocol for money modules.

Referring back to FIG. 13, a MM Commit subroutine is called (step 632). A Commit protocol as used in the preferred electronic monetary system is described in U.S. application Ser. No. 08/427,287 and shown in FIG. 22. Session Manager X sends a "Ready-to-Commit" message to Y (steps 1702–1704). This passes the obligation to commit to the module receiving the message. In a conventional money transfer scenario, this technique of passing the burden of committing first is used to ensure that the party transferring money commits first, so as to eliminate the possibility of duplicating money.

Session Manager Y then sends an acknowledgment to X (steps 1706–1708) and commits to any outstanding transactions by updating its transaction log (step 1710). Also, if Y is a transaction money module, then To subscriber Y notifies the subscriber of the successful transaction (steps 1712–1714). Session Manager Y notes the end of the session (step 1716).

Tran Log X receives the acknowledgement from Y and updates its transaction log, thus committing to any outstanding transfers. X completes its commit in the same manner as Y (steps 1718–1724).

This flow diagram is still followed when money modules 6 are interacting with trusted agents 120 with the understanding that Send Message=Send E-Routed Message and that To Subscriber messages are actually sent encrypted to the trusted agent 120. With the foregoing in mind, money module A's MM Session Manager sends a "Ready-To-Commit" message to money module B's MM Session Manager via the send E-Routed Message subroutine (steps 1702–1704). MM Session Manager B then sends an "Acknowledgement" message to money module A and money module B commits (steps 1706–1716). When money module A receives the "Acknowledgement" message it too commits (steps 1718–1724).

During the commit routines of money modules B and A, they generate messages sent to their trusted agents B and A, respectively (steps 1714, 1722) informing them that they have committed to the transaction and hence that the payment was successful.

Referring again to FIG. 13, the money modules then both send the aforementioned "Payment Successful" messages to their trusted agents (steps 584–586). These messages are encrypted by session key (TA/MM). Session Manager B detects that a successful payment has been made and Ticket Holder B updates the commercial payment ticket with payment information such as the date of transaction (steps 588, 592, 634). Trusted agent B then commits (step 636) so that its retention of the ticket is no longer "provisional". Similarly, Session Manager A detects a successful payment (steps 590, 594) and trusted agent A commits (step 638). The transaction is now complete.

After the successful money module payment, the host B requests the commercial payment ticket from trusted agent B. In response, Ticket Holder B sends the commercial payment ticket to HTB. HTB then sends the ticket and remittance advice to the accounts payable system as proof of payment. HTB also sends any invoices and past due notices not paid to the accounts payable system for setup. (steps 875–880).

Similarly, after the successful money module payment the host A requests the commercial payment ticket from trusted agent A. In response, Ticket Holder A sends the commercial payment ticket to HTA. HTA then sends the ticket and remittance advice to the accounts receivable system to match outstanding invoices. Such an invoice matching may also be performed during the transaction. HTA also sends the presentment ticket to the accounts receivable system for presentment verification. (Steps 882–886).

In this disclosure, there is shown and described the preferred embodiment of the invention, it being understood that the invention is capable of use in various other combinations and environments and is capable of changes or modifications within the scope of the inventive concepts as expressed herein.

I claim:

1. A system for secure presentment and payment, comprising:

a merchant electronic processing device having at least one data processor, memory, and cryptographic means;

a customer electronic processing device having at least one data processor, memory, and cryptographic means;

wherein said merchant electronic processing device creates a presentment ticket from stored invoice data, and securely transmits said presentment ticket and said invoice data to said customer electronic processing device;

wherein said customer electronic processing device determines which invoices are to be paid and creates a corresponding remittance advice which it securely transmits to said merchant electronic processing device;

wherein said merchant electronic processing device creates a commercial payment ticket corresponding to said remittance advice and securely transmits said commercial payment ticket to said customer electronic processing device;

where said customer electronic processing device securely transmits electronic money to said merchant electronic processing device in an amount corresponding to that specified in said remittance advice.

2. The system of claim 1, wherein said invoice data includes at least one current invoice data and/or at least one past due notice data.

3. The system of claim 2, wherein said invoice data is provided to said merchant electronic processing device by an automated invoicing system.

4. The system of claim 1, wherein a digital signature is created from said invoice data and included in said presentment ticket.

5. The system of claim 4, where said digital signature is a group signature.

6. The system of claim 5, where said customer electronic processing device verifies the received presentment ticket and said digital signature.

7. The system of claim 1, where said merchant and customer electronic processing devices perform interim log updates after said customer electronic processing device receives said presentment ticket.

8. The system of claim 7, wherein said interim log updates record transaction data including data derived from said invoice data.

9. The system of claim 8, wherein said data derived from said invoice data is data in said presentment ticket.

10. The system of claim 7, where said merchant and customer electronic processing devices perform final log updates after said customer electronic processing device transmits said electronic money to said merchant electronic processing device.

11. The system of claim 1, wherein said customer processing device initiates a request to an automated accounts payable system to check if any invoice indicated in said invoice data has already been paid.

12. The system of claim 11, wherein when said accounts payable system identifies remittance data in its database corresponding to an invoice indicated in said invoice data, said corresponding remittance data and its corresponding commercial payment ticket are sent to said merchant electronic processing device for verification.

13. The system of claim 1, wherein said customer electronic processing device queries a programmed cash management function to determine which invoices are to be paid.

14. The system of claim 1, wherein said customer transaction device checks for sufficient electronic money to make a full payment and, when sufficient funds are not available, selects a subset of the presented invoices for payment.

15. The system of claim 14, wherein said selection is based on priorization information from a programmed cash management function.

16. The system of claim 1, wherein said remittance advice includes data from invoices selected to be paid.

17. The system of claim 16, wherein said merchant electronic processing device validates said remittance advice by comparisons to said invoice data.

18. The system of claim 1, wherein said commercial payment ticket includes a digital signature created from said remittance advice.

19. The system of claim 1, wherein said commercial payment ticket and said remittance advice are sent to an automated accounts payable system as proof of payment.

20. The system of claim 19, wherein said commercial payment ticket and said remittance advice are sent to an automated accounts receivable system to match outstanding invoices.

21. The system of claim 20, wherein unpaid invoice data is sent to said accounts payable system for setup.

22. The system of claim 21, wherein said presentment ticket is sent to said accounts receivable system for presentment verification.

23. A system for secure presentment and payment, comprising:

a merchant electronic transaction device including:

a first host having at least one processor and memory, and a first trusted agent and first money module having at least one processor and memory;

a customer electronic transaction device including:

a second host having at least one processor and memory, and a second trusted agent and second money module having at least one processor and memory;

wherein said first host sends invoice data to said first trusted agent;

wherein said first trusted agent creates a presentment ticket corresponding to said invoice data, and sends said presentment ticket to said second trusted agent;

wherein said second trusted agent verifies said presentment ticket, and sends a remittance advice, corresponding to said invoice data, to said first trusted agent;

wherein said first trusted agent verifies said remittance advice, creates a commercial payment ticket, and sends said commercial payment ticket to said second trusted agent; and wherein said second money module sends electronic money to said first money module.

24. The system of claim 23, wherein said first and second trusted agents and said first and second money modules are fabricated as separate tamper-proof devices each having a microprocessor.

25. The system of claim 23, wherein said first trusted agent and said first money module are fabricated as a single tamper-proof device sharing a microprocessor and wherein said second trusted agent and said second money module are fabricated as a single tamper-proof device sharing a microprocessor.

26. The system of claim 25, wherein said first and second trusted agents and said first and second money modules communicate via cryptographically secure sessions.

27. The system of claim 23, wherein said second host creates said remittance advice and sends said remittance advice to said second trusted agent.

28. A method for secure presentment, comprising the steps of:

a merchant electronic processing device receiving invoice data;

said merchant electronic processing device creating a presentment ticket based on said invoice data, and securely sending said presentment ticket to a customer electronic processing device; and said customer electronic processing device verifying the validity of said presentment ticket and determining if any invoice is to be paid;

said customer electronic processing device creating a remittance advice based on the result of said determining step, and securely sending said remittance advice to said merchant electronic processing device; and said merchant electronic processing device validating said remittance advice.

29. The method of claim 27, further comprising the steps of:

said merchant electronic processing device creating and sending a commercial payment ticket to said customer electronic processing device; and said customer electronic processing device sending electronic money to said merchant electronic processing device.

* * * * *

UNITED STATES PATENT AND TRADEMARK OFFICE
CERTIFICATE OF CORRECTION

PATENT NO. : 6,081,790
DATED : June 27, 2000
INVENTOR(S) : Sholom S. Rosen

It is certified that error appears in the above-identified patent and that said Letters Patent is hereby corrected as shown below:

ON THE COVER PAGE

Item [56], References Cited:
Please insert the following reference which was omitted from the printed patent: WO 95/12859

Claim 15, Col. 22, line 52, "priorization" should read -- prioritization --.

Signed and Sealed this

First Day of May, 2001

Attest:

NICHOLAS P. GODICI

Attesting Officer     Acting Director of the United States Patent and Trademark Office